(12) United States Patent
Singh

(10) Patent No.: US 12,551,282 B2
(45) Date of Patent: Feb. 17, 2026

(54) PERCUTANEOUS MEDICAL DEVICE NAVIGATION SYSTEM

(71) Applicant: Medtronic Ireland Manufacturing Unlimited Company, Dublin (IE)

(72) Inventor: Manoj Kumar Singh, Santa Rosa, CA (US)

(73) Assignee: Medtronic Ireland Manufacturing Unlimited Company, Dublin (IE)

( * ) Notice: Subject to any disclaimer, the term of this patent is extended or adjusted under 35 U.S.C. 154(b) by 595 days.

(21) Appl. No.: 17/817,887

(22) Filed: Aug. 5, 2022

(65) Prior Publication Data

US 2023/0048662 A1 Feb. 16, 2023

Related U.S. Application Data

(60) Provisional application No. 63/231,993, filed on Aug. 11, 2021.

(51) Int. Cl.
*A61B 34/00* (2016.01)
*A61B 5/06* (2006.01)
*A61B 34/10* (2016.01)
*A61B 34/20* (2016.01)

(52) U.S. Cl.
CPC .............. *A61B 34/10* (2016.02); *A61B 5/062* (2013.01); *A61B 2034/2051* (2016.02)

(58) Field of Classification Search
CPC .................................................... A61B 34/10
See application file for complete search history.

(56) References Cited

U.S. PATENT DOCUMENTS

| | | | |
|---|---|---|---|
| 8,734,406 B2 | 5/2014 | Cressman | |
| 9,731,132 B2 | 8/2017 | Deem et al. | |
| 9,855,317 B2 | 1/2018 | Bright | |
| 10,925,633 B2 | 2/2021 | Page et al. | |
| 2008/0006551 A1 | 1/2008 | Tolley et al. | |
| 2011/0190787 A1 | 8/2011 | Sahni | |
| 2013/0345718 A1* | 12/2013 | Crawford | A61B 34/76 606/130 |
| 2017/0196590 A1* | 7/2017 | Sperry | A61B 17/3403 |

(Continued)

OTHER PUBLICATIONS

"Pathology of Renal Artery Ablation: Impact of Therapeutic Methods," American College of Cardiology, Sep. 26, 2018, 6 pp.

(Continued)

*Primary Examiner* — Joseph M Santos Rodriguez
(74) *Attorney, Agent, or Firm* — Shumaker & Sieffert, P.A.

(57) ABSTRACT

A medical device navigation system includes a medical device assembly and a navigation device. The medical device assembly includes an adhesive patch configured to adhere to an outer surface of a patient and a tracking assembly coupled to the adhesive patch. The tracking assembly includes one or more reference markers. The navigation device is configured to receive image data representing one or more images from an imaging device. The one or more images indicate a relative position between the one or more reference markers and a treatment site in the patient. The navigation device is configured to determine, based on the image data, a percutaneous insertion path for an injection needle from an insertion point to the treatment site of the patient and output one or more parameters corresponding to the percutaneous insertion path.

9 Claims, 16 Drawing Sheets

(56) References Cited

U.S. PATENT DOCUMENTS

| | | | |
|---|---|---|---|
| 2018/0021102 | A1 | 1/2018 | Azizian et al. |
| 2019/0105109 | A1 | 4/2019 | Kato |
| 2019/0282262 | A1 | 9/2019 | Bouazza-Marouf et al. |
| 2020/0054378 | A1 | 2/2020 | Kincaid et al. |
| 2020/0214738 | A1 | 7/2020 | Long, Jr. et al. |
| 2020/0297378 | A1 | 9/2020 | Hawkins et al. |

OTHER PUBLICATIONS

Auloge et al., "Augmented Reality and Artificial Intelligence-Based Navigation During Percutaneous Vertebroplasty: a Pilot Randomised Clinical Trial," European Spine Journal, vol. 29, 2020, pp. 1580-1589, citing only Abstract, retrieved from https://dialog.proquest.com/professional/docview/2251465110/1783C7505F6752F260E/4?accountid=157282 on Apr. 19, 2021, 2 pp.

Hecht et al., "Smartphone Augmented Reality CT-Based Platform for Needle Insertion Guidance: A Phantom Study," Cardiovascular Interventional Radiology, vol. 43, Issue 5, May 2020, pp. 756-764, Abstract retrieved from https://dialog.proquest.com/professional/docview/2397177752/1783C7505F6752F260E/5?accountid=157282 on Apr. 19, 2021, 2 pp.

Streitparth et al., "Percutaneous Computer Tomography-Guided Ethanol Sympathicolysis for the Treatment of Resistant Arterial Hypertension," Cardiovascular and Interventional Radiology, vol. 37, No. 2, Apr. 2014, pp. 513-518.

Von Jako et al., "A Novel Accurate Minioptical Tracking System for Percutaneous Needle Placement," IEEE Transactions on Biomedical Engineering, vol. 60, Issue 8, Aug. 2013, pp. 2222-2225, citing only Abstract, retrieved from https://dialog.proquest.com/professional/docview/1316711644/1783C7505F6752F260E/14?accountid=157282 on Apr. 19, 2021, 2 pp.

International Search Report and Written Opinion of International Application No. PCT/EP2022/072575 dated Nov. 18, 2022, 19 pp.

\* cited by examiner

PERCUTANEOUS MEDICAL DEVICE NAVIGATION SYSTEM

This application claims the benefit of U.S. Provisional Application No. 63/231,993, filed on Aug. 11, 2021, and entitled, "PERCUTANEOUS MEDICAL DEVICE NAVIGATION SYSTEM," the entire content of which is incorporated herein by reference.

TECHNICAL FIELD

The present technology is related to percutaneous medical device navigation systems. In particular, various examples of the present technology are related to percutaneous medical device navigation systems for renal neuromodulation.

BACKGROUND

The sympathetic nervous system (SNS) is a primarily involuntary bodily control system typically associated with stress responses. Fibers of the SNS extend through tissue in almost every organ system of the human body and can affect characteristics such as pupil diameter, gut motility, and urinary output. Such regulation can have adaptive utility in maintaining homeostasis or in preparing the body for rapid response to environmental factors. Chronic over-activation of the SNS, however, is a common maladaptive response that can drive the progression of many disease states. Excessive activation of the renal SNS in particular has been identified experimentally and in humans as a likely contributor to the complex pathophysiology of arrhythmias, hypertension, states of volume overload (e.g., heart failure), and progressive renal disease.

Sympathetic nerves of the kidneys terminate in the renal blood vessels, the juxtaglomerular apparatus, and the renal tubules, among other structures. Stimulation of the renal sympathetic nerves can cause, for example, increased renin release, increased sodium reabsorption, and reduced renal blood flow. These and other neural-regulated components of renal function can be considerably stimulated in disease states characterized by heightened sympathetic tone. For example, reduced renal blood flow and glomerular filtration rate as a result of renal sympathetic efferent stimulation may be a cornerstone of the loss of renal function in cardio-renal syndrome, (i.e., renal dysfunction as a progressive complication of chronic heart failure).

Pharmacologic strategies to thwart the consequences of renal sympathetic stimulation include centrally-acting sympatholytic drugs, beta blockers (e.g., to reduce renin release), angiotensin-converting enzyme inhibitors and receptor blockers (e.g., to block the action of angiotensin II and aldosterone activation consequent to renin release), and diuretics (e.g., to counter the renal sympathetic mediated sodium and water retention). These pharmacologic strategies, however, can have significant limitations including limited efficacy, compliance issues, side effects, and others.

SUMMARY

The present technology is directed to devices, systems, and methods for navigating a percutaneous medical device to a target site, such as a percutaneous medical device to renal sympathetic nerves for renal neuromodulation.

In some examples, the disclosure describes a medical device assembly that includes an adhesive patch, a tracking assembly, and a guide assembly. The adhesive patch is configured to adhere to an outer surface of a patient. The tracking assembly is coupled to the adhesive patch and includes one or more reference markers. The guide assembly is removably coupled to the adhesive patch. The guide assembly defines an orientation of a percutaneous insertion path of an injection needle from an insertion point to a treatment site of the patient.

In some examples, the disclosure describes a navigation device configured to receive image data representing one or more images from an imaging device. The one or more images indicate a relative position between one or more reference markers of a medical device assembly positioned on a patient and a treatment site in the patient. The navigation device is further configured to determine, based on the image data, a percutaneous insertion path for an injection needle from an insertion point to the treatment site in the patient and output one or more parameters corresponding to the percutaneous insertion path.

In some examples, the disclosure describes a method, including receiving, by a navigation device and from an imaging device, image data representing one or more images. The one or more images indicate a relative position between one or more reference markers on a medical device assembly positioned on a patient and a treatment site in a patient. The medical device assembly includes an adhesive patch configured to adhere to an outer surface of the patient and a tracking assembly coupled to the adhesive patch. The tracking assembly includes the one or more reference markers. The method further includes determining, by the navigation device and based on the image data, a percutaneous insertion path for an injection needle from an insertion point to the treatment site of the patient and outputting, by the navigation device, one or more parameters corresponding to the percutaneous insertion path.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Reference is made to the attached drawings, wherein elements having the same reference numeral designations represent similar elements throughout and wherein.

DETAILED DESCRIPTION

Figure 1:
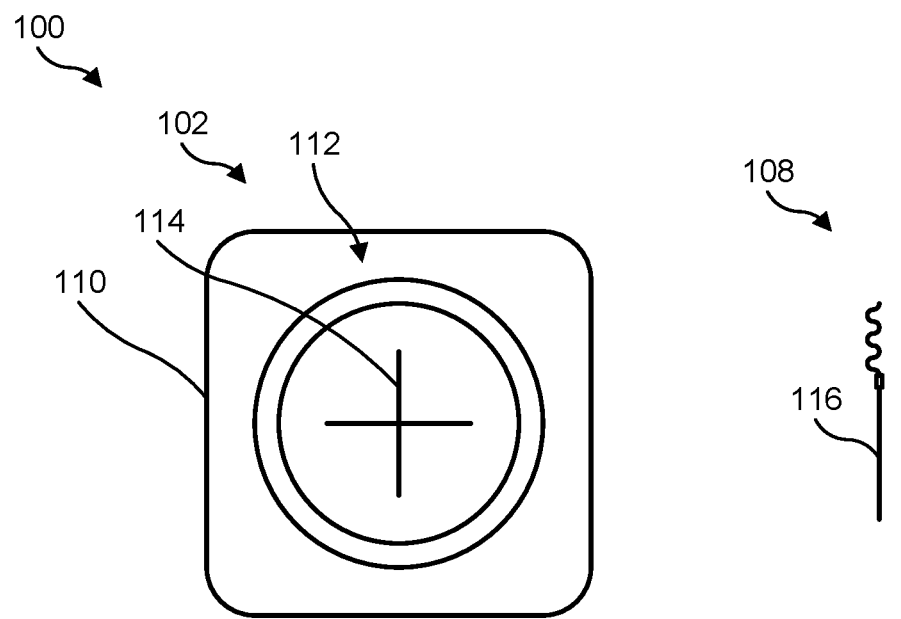
FIG. 1 is a partially schematic illustration of a percutaneous medical device navigation system configured in accordance with some examples of the disclosure.
Figure 1:
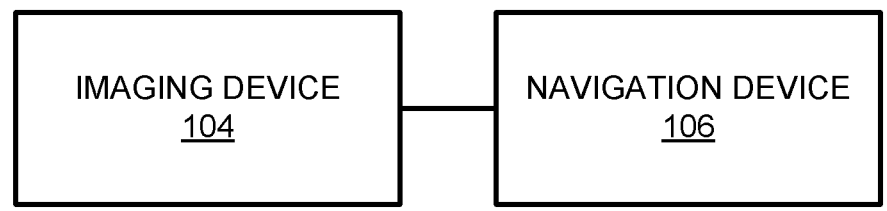

The present technology is directed to devices, systems, and methods for neuromodulation, such as renal neuromodulation, using chemical agents.

As used herein, the terms "distal" and "proximal" define a position or direction with respect to the treating clinician or clinician's control device (e.g., an injection assembly). "Distal" or "distally" can refer to a position distant from or in a direction away from the clinician or clinician's control device. "Proximal" and "proximally" can refer to a position near or in a direction toward the clinician or clinician's control device.

Various medical ablation procedures may involve accessing and ablating tissues, such as nerves, near vasculature of a patient. As one example, renal neuromodulation may be used to treat a variety of conditions, such as hypertension, heart failure, and chronic kidney disease, by modulating activation of the renal sympathetic neural system. Renal sympathetic nerves of the renal sympathetic nervous system generally are near or within walls of renal arteries, such that the renal arteries may provide access to the renal sympathetic nerves. Renal neuromodulation treatments, such as renal denervation, may be accomplished using one or more of a variety of treatment modalities, including radio frequency (RF) energy, microwave energy, ultrasound energy, a chemical agent, or the like.

Renal neuromodulation using a chemical agent may be useful for ablating the renal sympathetic nerves. Chemical ablation may operate by injecting a chemical agent into tissues near the renal artery to chemically ablate the renal sympathetic nerves. The chemical agent may be selected to modulate activity of one or more renal nerves adjacent to the renal artery in which the neuromodulation catheter is positioned. For example, the chemical agent may be a neurotoxic chemical selected to chemically ablate the one or more renal nerves near the renal artery. During a chemical ablation procedure, a clinician may anesthetize a patient and guide a neuromodulation catheter through the patient's renal artery to a treatment site. The neuromodulation catheter may include at least one port or needle through which a chemical agent is delivered. Once the clinician has injected the chemical agent into the tissues near the renal artery and removed the neuromodulation catheter from the patient, the clinician may continue to monitor the patient over a span of days or weeks to determine whether the treated condition has been alleviated. In some examples, the patient may undergo additional iterations of this procedure until the condition has been sufficiently treated.

In accordance with techniques of this disclosure, a medical device assembly may be used to determine a percutaneous insertion path of a needle to a treatment site of a patient for delivering a chemical agent to the treatment site during a chemical ablation procedure. Rather than accessing the treatment site through vasculature of the patient, the medical device assembly may be used in conjunction with a needle assembly to directly access the treatment site from an outer surface of the patient near the treatment site. The medical device assembly may adhere to the patient during and after an initial chemical ablation procedure and operate as a reference point for tissue imaging of the treatment site prior to the initial chemical ablation procedure. The medical device assembly includes an adhesive patch that adheres to an outer surface of the patient near the treatment site. For example, the renal artery of an adult may be within about 10 centimeters of the mid-back of the patient, such that the medical device assembly may be positioned on the mid-back near the renal artery. The medical device assembly also includes a tracking assembly coupled to the adhesive patch. The tracking assembly includes reference markers, such as radiopaque markers, that operate as reference points for an imaging device. In some instances, the medical device assembly may include a coupling assembly that securely mounts a guide assembly or actuation assembly.

Prior to chemical ablation, the treatment site of the patient may be imaged to determine a location of the treatment site relative to the reference markers. For example, an imaging device may generate images that indicate a relative three-dimensional location between the reference markers and the treatment site of the patient. The relative location of the treatment site to the reference marker may be used to determine a percutaneous insertion path of the injection needle and control or guide an injection needle to the treatment site. For example, a navigation device may determine, based on the images, the percutaneous insertion path for the injection needle from an insertion point to the treatment site of the patient and output parameters that correspond to the percutaneous insertion path. During chemical ablation, the injection needle may be inserted into the patient from outside the patient's body along the percutaneous insertion path to the treatment site. Once positioned, the injection needle may inject the chemical agent and withdraw from the patient. At least part of the medical device assembly may remain on the patient for a period of days or weeks and continue to be used as a reference point for any subsequent injections. In this way, tissues may be treated using chemical ablation without catheterization and without redundant imaging for subsequent chemical ablation procedures.

In some examples, medical device assemblies described herein may be used in conjunction with a guidance system to position, and optionally insert, the injection needle. During the procedure, the guidance system may use the parameters of the percutaneous insertion path to guide the needle, or provide guidance to a clinician handling the needle, to the treatment site. In some examples, the navigation system may output guidance before or during the chemical ablation procedure to aid the clinician in manually inserting the needle and injecting a chemical solution. For example, the navigation system may determine a relative location of the treatment site and present images, information, or instructions, through the guidance system, on where to insert the needle and/or how deep to insert the needle.

In some examples, the guidance system may augment control of an injection assembly during chemical ablation. The medical device assembly may couple to a guide assembly to physically guide the injection needle along the percutaneous insertion path to the treatment site. For example, the guide assembly may include a ball joint or other structure that couples to the adhesive patch and secures into a fixed position that defines the percutaneous insertion path to the treatment site. A clinician (or robot) may position the guide assembly into the fixed orientation, such as based on determined azimuthal and polar angles, and insert the injection needle through the guide assembly to a predetermined depth to reach the treatment site and inject the chemical solution. In some examples, the guidance system may fully control an injection assembly during chemical ablation. For example, the guidance system may control a x-, y-, and z-position of the injection needle relative to the medical device assembly to insert the injection needle to the treatment site.

In some examples, the navigation device may receive position data and generate feedback for controlling the injection apparatus during chemical ablation. For example, the navigation device may monitor a position of the injection needle relative to the treatment site or the guidance system and indicate repositioning of the needle if the position of the injection needle is incorrect or requires adjustment. During positioning of the injection needle, a clinician or robot may guide the injection needle to a desired depth using the monitored position.

FIG. 1 is a partially schematic illustration of a percutaneous medical device navigation system 100 configured in accordance with some examples of the present disclosure. Medical device navigation system 100 is configured to guide, or provide guidance for, a distal end of an injection needle 116 of a needle assembly 108 to a treatment site of a patient. Needle assembly 108 is configured to deliver a chemical agent to the treatment site of the patient. Injection needle 116 is configured to extend through one or more tissues of the patient to the treatment site, and includes a length and width sufficient for both penetrating the tissues and reaching the treatment site from a surface of the patient. While not shown, injection needle 116 includes a lumen for delivering the chemical agent, and may include a variety of shapes including a straight configuration (as shown) or a curved configuration. In some examples, injection needle 116 may be relatively small, such as an outer diameter less than about 10 mm and/or an inner lumen less than about 5 millimeters, such as one millimeter.

While percutaneous insertion of injection needle 116 to the treatment site may be less invasive and permit easier access to the treatment site than vascular delivery of an ablation catheter, insertion of injection needle 116 may not rely on vasculature of the patient to position a point of injection of the chemical agent near to the treatment site, such as may be the case with an ablation catheter. To accurately guide injection needle 116 to the treatment site, medical device navigation system 100 includes a medical device assembly 102 for positioning on an outer surface of the patient. Once positioned on the patient, medical device assembly 102 functions as an external reference point at the outer surface of the patient for determining a delivery orientation and delivery depth of injection needle 116 from medical device assembly 102 to the treatment site of the patient.

Medical device assembly 102 includes an adhesive patch 110 and a tracking assembly 112 coupled to adhesive patch 110. Adhesive patch 110 is configured to adhere to an outer surface of a patient, such as the skin, and maintain a relatively consistent position of tracking assembly 112 on the patient during imaging of medical device assembly 102 and, in some instances, after imaging of medical device assembly 102. Tracking assembly 112 includes one or more reference markers 114. Reference markers 114 include a material that is visible in a medical image generated by an imaging device 104. Depending on a type of imaging used for imaging device 104, a variety of materials may be used for reference markers 114 including, but not limited to, radiopaque markers, and the like. Reference markers may be present on tracking assembly 112 in a variety of designs, such as designs that indicate a position of medical device assembly 102 on the patient, such that a relative position of medical device assembly 102 with respect to the treatment site may be determined, and optionally indicate an orientation of a plane of medical device assembly 102 on the patient, such that a relative orientation of medical device assembly 102 with respect to the surrounding of the patient (e.g., patient position) may be determined and repeated in future procedures.

Medical device navigation system 100 includes an imaging device 104. Imaging device 104 is configured to generate one or more images of medical device assembly 102 on the patient. The one or more images indicate a relative position between reference markers 114 and a treatment site in the patient. Imaging device 104 may include any suitable imaging modality configured to image medical device assembly 102 while medical device assembly 102 is positioned on the patient. In some examples, imaging device 104 includes a computed tomography (CT) machine, a fluoroscopy machine, an intravascular ultrasound (IVUS) machine, an optical coherence tomography (OCT) machine, an intracardiac echocardiography (ICE) machine, or another suitable guidance modality, or combinations thereof.

Medical device navigation system 100 includes a navigation device 106 configured to receive one or more images from imaging device 104. The one or more images from imaging device 104 may indicate a relative position of medical device assembly 102 with respect to the treatment site. For example, the one or more images may be taken from different angles to generate a three-dimensional representation of a volume that includes medical device assembly 102 and the treatment site. Navigation device 106 is configured to determine, based on the one or more images, a percutaneous insertion path for injection needle 116 from an insertion point at medical device assembly 102 to the treatment site of the patient. For example, navigation device 106 may determine an insertion path from medical device assembly 102 to the treatment site that avoids particular tissues (e.g., bones or cartilage of the ribs) or accesses particular renal nerves. Navigation device 106 is configured to output one or more parameters corresponding to the percutaneous insertion path. The one or more parameters define the percutaneous insertion path, and may provide guidance to an unaided clinician (e.g., via a display), an aided clinician (e.g., via a guide assembly), or an automated system (e.g., via an actuation assembly).

Figure 2A:
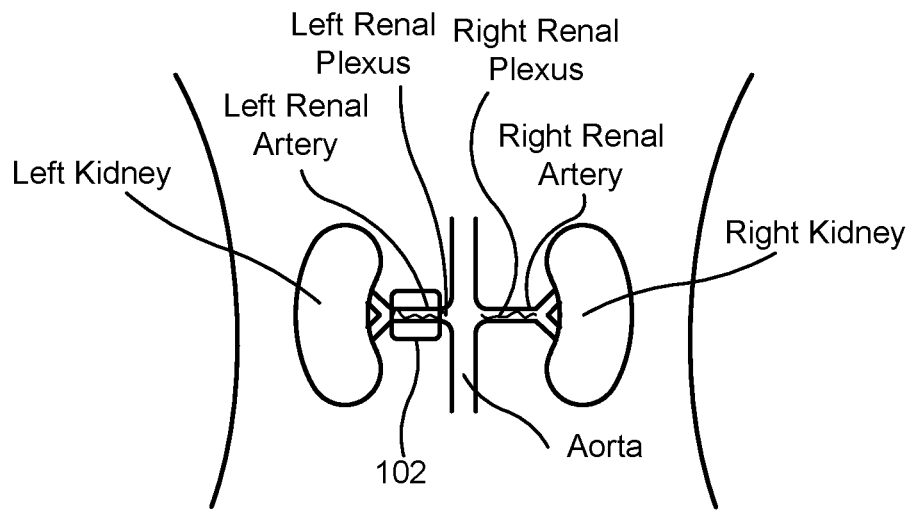
FIG. 2A is a back view conceptual illustration of accessing of a renal artery and modulating renal nerves with the example medical device navigation system of FIG. 1, in accordance with some examples of the disclosure.
Figure 2B:
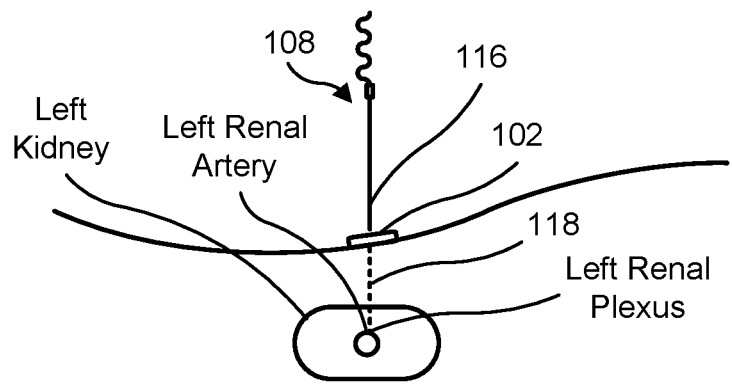
FIG. 2B is a side view conceptual illustration of accessing of a renal artery and modulating renal nerves with the example medical device navigation system of FIG. 1, in accordance with some examples of the disclosure.

FIGS. 2A and 2B are respective back view and side view conceptual illustrations of accessing of a renal artery and modulating renal nerves with the example medical device navigation system of FIG. 1, in accordance with some examples of the present disclosure. FIG. 2A illustrates medical device assembly 102 positioned near a treatment site of a patient. In the example of FIG. 2A, the treatment site is a left renal plexus corresponding to the left renal artery. Once medical device assembly 102 is positioned on the patient, imaging device 104 (FIG. 1) may generate images that indicate the relative position between medical device assembly 102 and the left renal plexus.

FIG. 2B illustrates gaining access to renal nerves of an example patient in accordance with some examples of the present technology. Navigation device 106 determines insertion path 118 to the left renal plexus from a percutaneous access site to a targeted treatment site within the left renal plexus. Needle assembly 108, via injection needle 116, provides access to the left renal plexus through insertion path 118. By manipulating a proximal portion of injection needle 116 from outside insertion path 118, a clinician may advance at least a distal portion of injection needle 116 along insertion path 118 and directly manipulate the distal portion of injection needle 116. During insertion, navigation device 106 may provide further feedback as to a position of injection needle with respect to insertion path 118, such as by monitoring a position of injection needle 116 via position sensors or imaging device 104. The clinician may target different treatment sites corresponding to different insertion paths 118 of injection needle 116, or may target the same treatment site at different intervals over a period of time.

Renal neuromodulation is the partial or complete incapacitation or other effective disruption of nerves of the kidneys (e.g., nerves terminating in the kidneys or in structures closely associated with the kidneys). In particular, renal neuromodulation can include inhibiting, reducing, and/or blocking neural communication along neural fibers (e.g., efferent and/or afferent neural fibers) of the kidneys. Such incapacitation can be long-term (e.g., permanent or for periods of months, years, or decades) or short-term (e.g., for periods of minutes, hours, days, or weeks). Renal neuromodulation is expected to contribute to the systemic reduction of sympathetic tone or drive and/or to benefit at least some specific organs and/or other bodily structures innervated by sympathetic nerves. Accordingly, renal neuromodulation is expected to be useful in treating clinical conditions associated with systemic sympathetic overactivity or hyperactivity, particularly conditions associated with central sympathetic overstimulation. For example, renal neuromodulation is expected to efficaciously treat hypertension, heart failure, acute myocardial infarction, metabolic syndrome, insulin resistance, diabetes, left ventricular hypertrophy, chronic and end stage renal disease, inappropriate fluid retention in heart failure, cardio-renal syndrome, polycystic kidney disease, polycystic ovary syndrome, osteoporosis, erectile dysfunction, and sudden death, among other conditions. Renal neuromodulation can be chemically-induced at one or more suitable target sites during a treatment procedure. The target site can be within or otherwise proximate to a renal lumen (e.g., a renal artery, a ureter, a renal pelvis, a major renal calyx, a minor renal calyx, or another suitable structure), and the treated tissue can include tissue at least proximate to a wall of the renal lumen. For example, with regard to a renal artery, a treatment procedure can include modulating nerves in the renal plexus, which lay intimately within or adjacent to the adventitia of the renal artery.

In some instances, effects of renal neuromodulation may not be immediately recognized. For example, changes in physiological effects caused incapacitation of the renal nerves may take several weeks. As a result, a patient may have to repeat the renal neuromodulation procedure one or more times at several week intervals. By imaging medical device assembly 102 and leaving medical device assembly 102 on the patient for the duration of treatment, medical device assembly 102 may enable repeat treatments without requiring additional imaging or repeated catheterization.

The following discussion provides further details regarding patient anatomy and physiology as it may relate to renal denervation therapy. This section is intended to supplement and expand upon the previous discussion regarding the relevant anatomy and physiology, and to provide additional context regarding the disclosed technology and the therapeutic benefits associated with renal denervation. For example, several properties of the renal vasculature may inform the design of treatment devices and associated methods for achieving renal neuromodulation via intravascular access and impose specific design requirements for such devices. Specific design requirements may include accessing the renal artery, positioning therapeutic elements within the renal artery and relative to other physiological structures (such as an accessory renal artery), delivering the chemical agent to targeted tissue, and/or effectively modulating the renal nerves with the therapy delivery device.

As noted previously, the sympathetic nervous system (SNS) is a branch of the autonomic nervous system along with the enteric nervous system and parasympathetic nervous system. It is always active at a basal level (called sympathetic tone) and becomes more active during times of stress. Like other parts of the nervous system, the sympathetic nervous system operates through a series of interconnected neurons. Sympathetic neurons are frequently considered part of the peripheral nervous system (PNS), although many lie within the central nervous system (CNS). Sympathetic neurons of the spinal cord (which is part of the CNS) communicate with peripheral sympathetic neurons via a series of sympathetic ganglia. Within the ganglia, spinal cord sympathetic neurons join peripheral sympathetic neurons through synapses. Spinal cord sympathetic neurons are therefore called presynaptic (or preganglionic) neurons, while peripheral sympathetic neurons are called postsynaptic (or postganglionic) neurons.

At synapses within the sympathetic ganglia, preganglionic sympathetic neurons release acetylcholine, a chemical messenger that binds and activates nicotinic acetylcholine receptors on postganglionic neurons. In response to this stimulus, postganglionic neurons principally release noradrenaline (norepinephrine). Prolonged activation may elicit the release of adrenaline from the adrenal medulla.

Once released, norepinephrine and epinephrine bind adrenergic receptors on peripheral tissues. Binding to adrenergic receptors causes a neuronal and hormonal response. The physiologic manifestations include pupil dilation, increased heart rate, occasional vomiting, and increased blood pressure. Increased sweating is also seen due to binding of cholinergic receptors of the sweat glands.

The sympathetic nervous system is responsible for up- and down-regulating many homeostatic mechanisms in living organisms. Fibers from the SNS innervate tissues in almost every organ system, providing at least some regulatory function to physiological features as diverse as pupil diameter, gut motility, and urinary output. This response is also known as sympatho-adrenal response of the body, as the preganglionic sympathetic fibers that end in the adrenal medulla (but also all other sympathetic fibers) secrete acetylcholine, which activates the secretion of adrenaline (epinephrine) and to a lesser extent noradrenaline (norepinephrine). Therefore, this response that acts primarily on the cardiovascular system is mediated directly via impulses transmitted through the sympathetic nervous system and indirectly via catecholamines secreted from the adrenal medulla.

Science typically looks at the SNS as an automatic regulation system, that is, one that operates without the intervention of conscious thought. Some evolutionary theorists suggest that the sympathetic nervous system operated in early organisms to maintain survival as the sympathetic nervous system is responsible for priming the body for action. One example of this priming is in the moments before waking, in which sympathetic outflow spontaneously increases in preparation for action.

Figure 3:
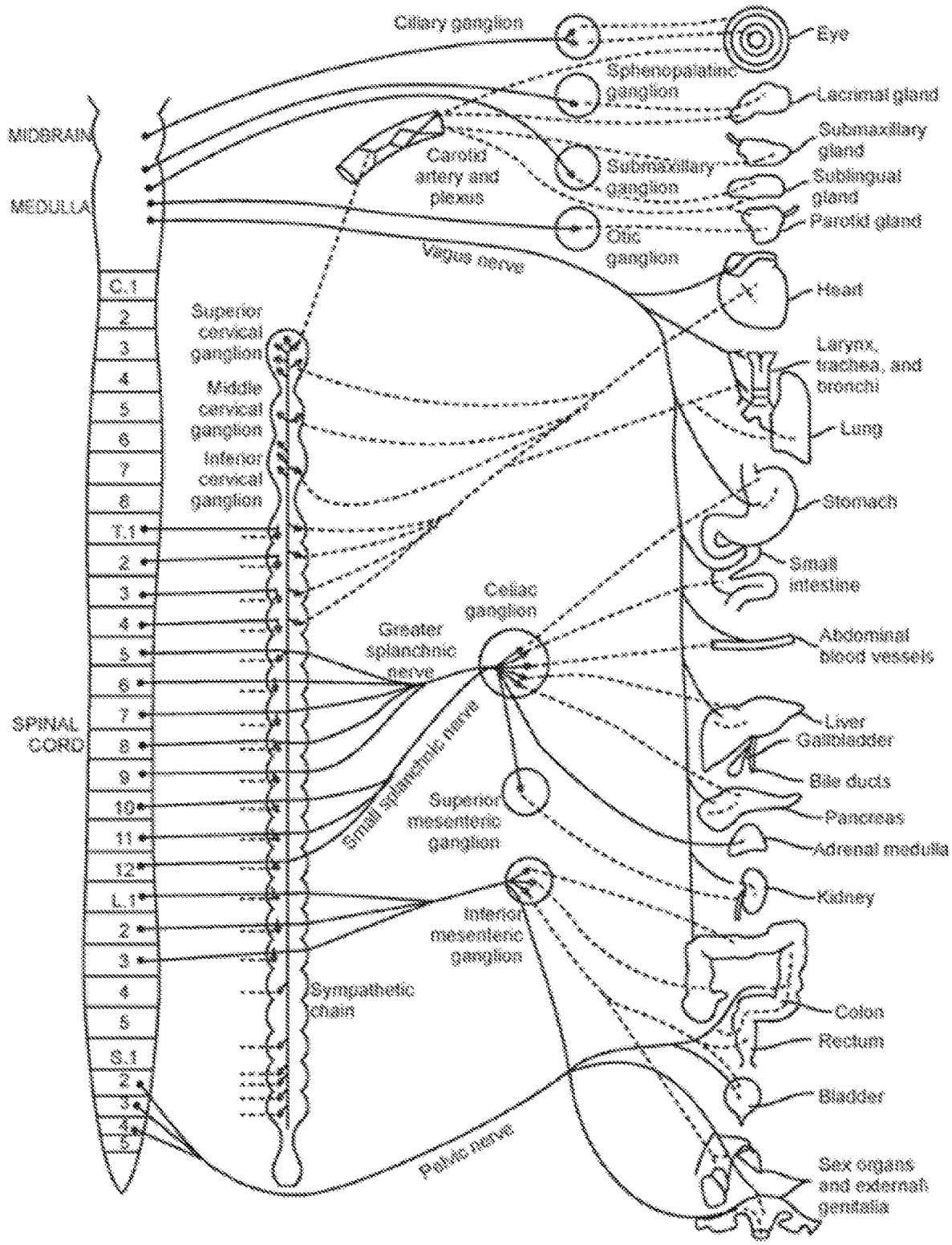
FIG. 3 is a conceptual illustration of an example sympathetic nervous system (SNS) and how the brain communicates with the body via the SNS.

As shown in FIG. 3, the SNS provides a network of nerves that allows the brain to communicate with the body. Sympathetic nerves originate inside the vertebral column, e.g., toward the middle of the spinal cord in the intermediolateral cell column (or lateral horn), beginning at the first thoracic segment of the spinal cord and are thought to extend to the second or third lumbar segments. Because SNS cells begin in the thoracic and lumbar regions of the spinal cord, the SNS is said to have a thoracolumbar outflow. Axons of these nerves leave the spinal cord through the anterior rootlet/root. They pass near the spinal (sensory) ganglion, where they enter the anterior rami of the spinal nerves. However, unlike somatic innervation, they quickly separate out through white rami connectors which connect to either the paravertebral (which lie near the vertebral column) or prevertebral (which lie near the aortic bifurcation) ganglia extending alongside the spinal column.

In order to reach the target organs and glands, the axons should travel long distances in the body, and, to accomplish this, many axons relay their message to a second cell through synaptic transmission. The ends of the axons link across a space, the synapse, to the dendrites of the second cell. The first cell (the presynaptic cell) sends a neurotransmitter across the synaptic cleft where it activates the second cell (the postsynaptic cell). The message is then carried to the final destination.

In the SNS and other components of the peripheral nervous system, these synapses are made at sites called ganglia, discussed above. The cell that sends its fiber to the ganglion is called a preganglionic cell, while the cell whose fiber leaves the ganglion is called a postganglionic cell. As mentioned previously, the preganglionic cells of the SNS are located between the first thoracic (T1) segment and third lumbar (L3) segments of the spinal cord. Postganglionic cells have their cell bodies in the ganglia and send their axons to target organs or glands.

The ganglia include not just the sympathetic trunks but also the cervical ganglia (superior, middle and inferior), which sends sympathetic nerve fibers to the head and thorax organs, and the celiac and mesenteric ganglia (which send sympathetic fibers to the gut).

Figure 4:
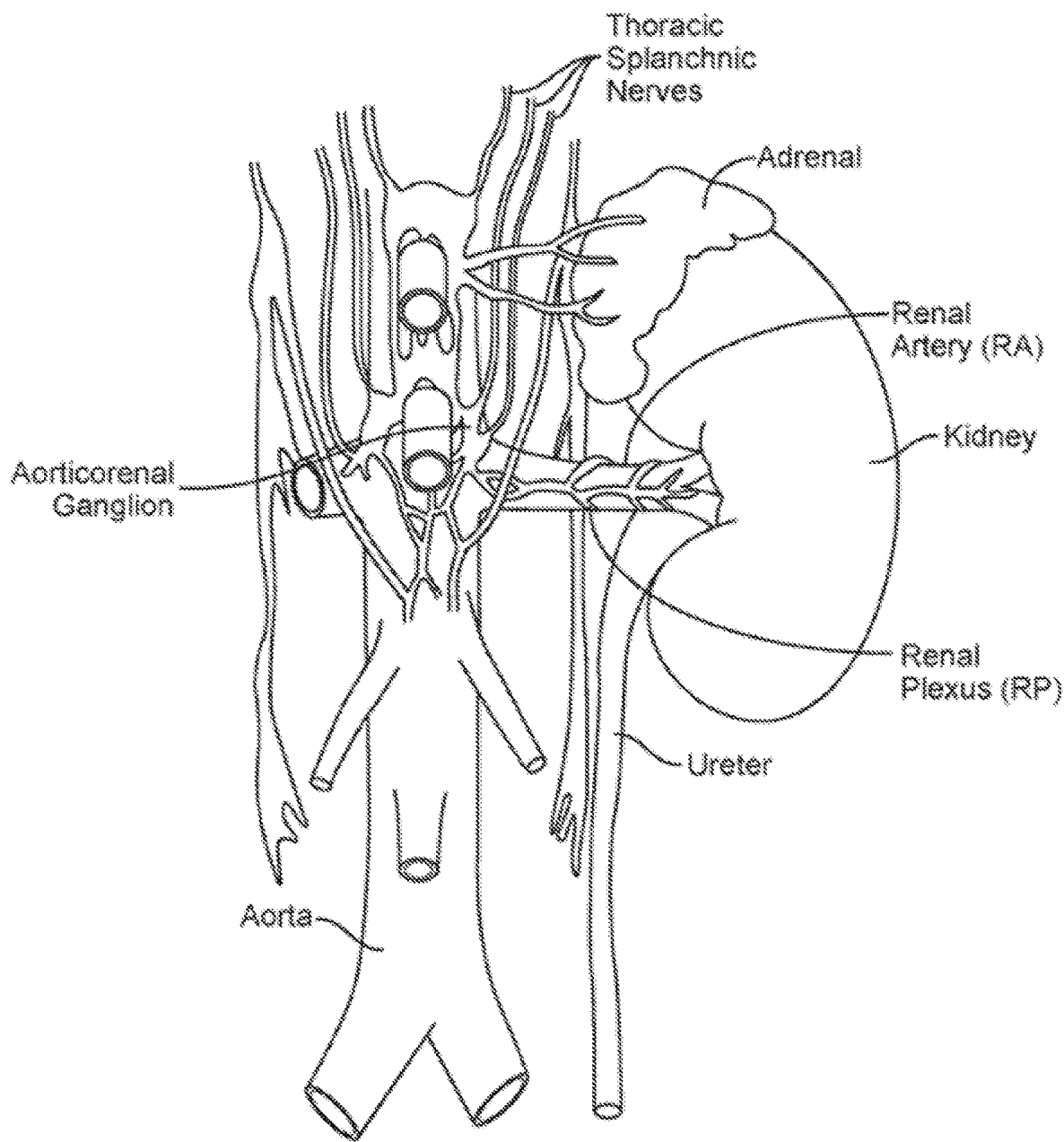
FIG. 4 is an enlarged anatomic view of nerves innervating a left kidney to form the renal plexus surrounding the left renal artery.

As FIG. 4 shows, the kidney is innervated by the renal plexus (RP), which is intimately associated with the renal artery. The renal plexus (RP) is an autonomic plexus that surrounds the renal artery and is embedded within the adventitia of the renal artery. The renal plexus (RP) extends along the renal artery until it arrives at the substance of the kidney. Fibers contributing to the renal plexus (RP) arise from the celiac ganglion, the superior mesenteric ganglion, the aorticorenal ganglion and the aortic plexus. The renal plexus (RP), also referred to as the renal nerve, is predominantly comprised of sympathetic components. There is no (or at least very minimal) parasympathetic innervation of the kidney.

Preganglionic neuronal cell bodies are located in the intermediolateral cell column of the spinal cord. Preganglionic axons pass through the paravertebral ganglia (they do not synapse) to become the lesser splanchnic nerve, the least splanchnic nerve, the first lumbar splanchnic nerve, the second lumbar splanchnic nerve, and travel to the celiac ganglion, the superior mesenteric ganglion, and the aorticorenal ganglion. Postganglionic neuronal cell bodies exit the celiac ganglion, the superior mesenteric ganglion, and the aorticorenal ganglion to the renal plexus (RP) and are distributed to the renal vasculature.

Messages travel through the SNS in a bidirectional flow. Efferent messages may trigger changes in different parts of the body simultaneously. For example, the sympathetic nervous system may accelerate heart rate; widen bronchial passages; decrease motility (movement) of the large intestine; constrict blood vessels; increase peristalsis in the esophagus; cause pupil dilation, piloerection (goose bumps) and perspiration (sweating); or raise blood pressure. Afferent messages carry signals from various organs and sensory receptors in the body to other organs and, particularly, the brain.

Hypertension, heart failure, and chronic kidney disease are a few of many disease states that result from chronic activation of the SNS, especially the renal sympathetic nervous system. Chronic activation of the SNS is a maladaptive response that drives the progression of these disease states. Pharmaceutical management of the renin-angiotensin-aldosterone system (RAAS) has been a longstanding, but somewhat ineffective, approach for reducing over-activity of the SNS.

As mentioned above, the renal sympathetic nervous system has been identified as a major contributor to the complex pathophysiology of hypertension, states of volume overload (such as heart failure), and progressive renal disease, both experimentally and in humans. Studies employing radiotracer dilution methodology to measure overflow of norepinephrine from the kidneys to plasma revealed increased renal norepinephrine (NE) spillover rates in patients with essential hypertension, particularly so in young hypertensive subjects, which in concert with increased NE spillover from the heart, is consistent with the hemodynamic profile typically seen in early hypertension and characterized by an increased heart rate, cardiac output, and renovascular resistance. It is now known that essential hypertension is commonly neurogenic, often accompanied by pronounced sympathetic nervous system overactivity.

Activation of cardiorenal sympathetic nerve activity is even more pronounced in heart failure, as demonstrated by an exaggerated increase of NE overflow from the heart and the kidneys to plasma in this patient group. In line with this notion is the recent demonstration of a strong negative predictive value of renal sympathetic activation on all-cause mortality and heart transplantation in patients with congestive heart failure, which is independent of overall sympathetic activity, glomerular filtration rate, and left ventricular ejection fraction. These findings support the notion that treatment regimens that are designed to reduce renal sympathetic stimulation have the potential to improve survival in patients with heart failure.

Both chronic and end stage renal disease in some patients are characterized by heightened sympathetic nervous activation. In patients with end stage renal disease, plasma levels of norepinephrine above the median have been demonstrated to be predictive for both all-cause death and death from cardiovascular disease. This can also be true for patients suffering from diabetic or contrast nephropathy. There is compelling evidence suggesting that sensory afferent signals originating from the diseased kidneys are major contributors to initiating and sustaining elevated central sympathetic outflow in this patient group; this facilitates the occurrence of the well-known adverse consequences of chronic sympathetic over activity, such as hypertension, left ventricular hypertrophy, ventricular arrhythmias, sudden cardiac death, insulin resistance, diabetes, and metabolic syndrome.

Sympathetic nerves to the kidneys terminate in the blood vessels, the juxtaglomerular apparatus, and the renal tubules. Stimulation of the renal sympathetic nerves causes increased renin release, increased sodium ($Na^+$) reabsorption, and a reduction of renal blood flow. These components of the neural regulation of renal function are considerably stimulated in disease states characterized by heightened sympathetic tone and clearly contribute to the rise in blood pressure in hypertensive patients. The reduction of renal blood flow and glomerular filtration rate as a result of renal sympathetic efferent stimulation may be a cornerstone of the loss of renal function in cardio-renal syndrome, which is renal dysfunction as a progressive complication of chronic heart failure, with a clinical course that typically fluctuates with the patient's clinical status and treatment. Pharmacologic strategies to thwart the consequences of renal efferent sympathetic stimulation include centrally acting sympatholytic drugs, beta blockers (intended to reduce renin release), angiotensin converting enzyme inhibitors and receptor blockers (intended to block the action of angiotensin II and aldosterone activation consequent to renin release), and diuretics (intended to counter the renal sympathetic mediated sodium and water retention). However, the current pharmacologic strategies can have significant limitations including limited efficacy, compliance issues, side effects and others.

Figure 5:
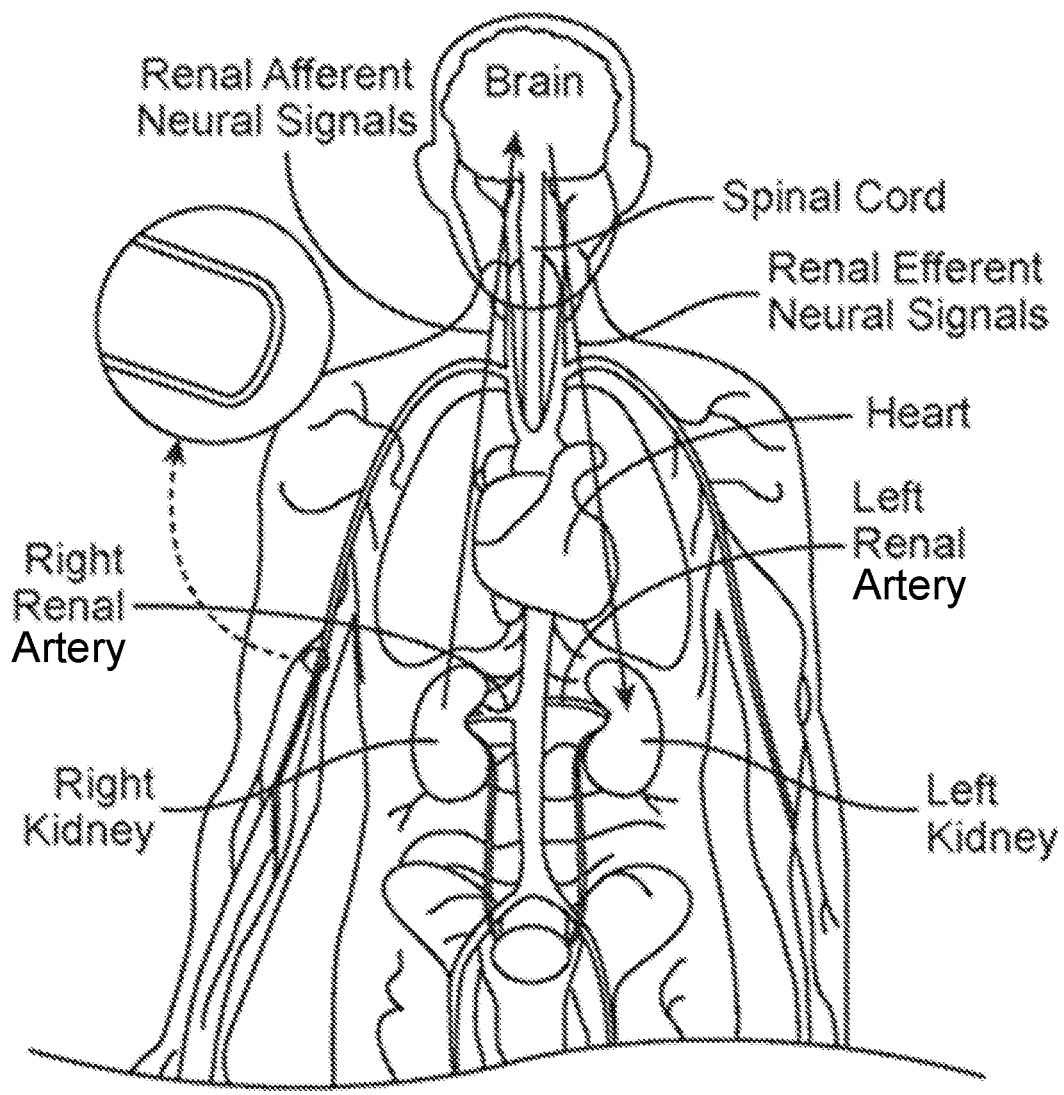
FIG. 5 is an anatomic view of a human body depicting neural efferent and afferent communication between the brain and kidneys.
Figure 6:
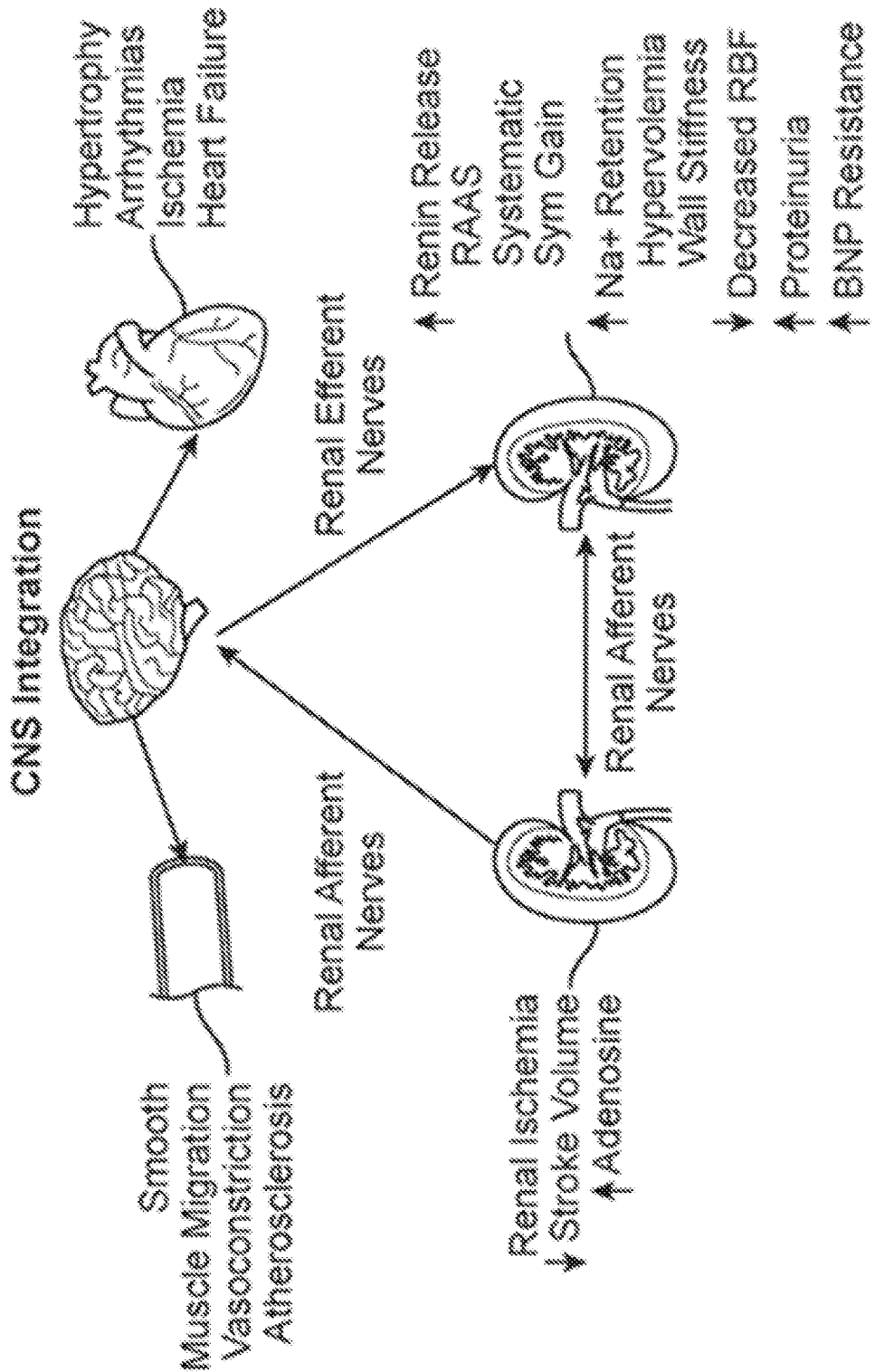
FIG. 6 is a conceptual view of a human body depicting neural efferent and afferent communication between the brain and kidneys.

The kidneys communicate with integral structures in the central nervous system via renal sensory afferent nerves. Several forms of "renal injury" may induce activation of sensory afferent signals. For example, renal ischemia, reduction in stroke volume or renal blood flow, or an abundance of adenosine enzyme may trigger activation of afferent neural communication. As shown in FIGS. 5 and 6, this afferent communication might be from the kidney to the brain or might be from one kidney to the other kidney (via the central nervous system). These afferent signals are centrally integrated and may result in increased sympathetic outflow. This sympathetic drive is directed towards the kidneys, thereby activating the RAAS and inducing increased renin secretion, sodium retention, volume retention, and vasoconstriction. Central sympathetic over activity also impacts other organs and bodily structures innervated by sympathetic nerves such as the heart and the peripheral vasculature, resulting in the described adverse effects of sympathetic activation, several aspects of which also contribute to the rise in blood pressure.

The physiology therefore suggests that (i) modulation of tissue with efferent sympathetic nerves will reduce inappropriate renin release, salt retention, and reduction of renal blood flow, and that (ii) modulation of tissue with afferent sensory nerves will reduce the systemic contribution to hypertension and other disease states associated with increased central sympathetic tone through its direct effect on the posterior hypothalamus as well as the contralateral kidney. In addition to the central hypotensive effects of afferent renal denervation, a desirable reduction of central sympathetic outflow to various other sympathetically innervated organs such as the heart and the vasculature is anticipated.

As provided above, renal denervation is likely to be valuable in the treatment of several clinical conditions characterized by increased overall and particularly renal sympathetic activity such as hypertension, metabolic syndrome, insulin resistance, diabetes, left ventricular hypertrophy, chronic end stage renal disease, inappropriate fluid retention in heart failure, cardio-renal syndrome, and sudden death. Since the reduction of afferent neural signals contributes to the systemic reduction of sympathetic tone/drive, renal denervation might also be useful in treating other conditions associated with systemic sympathetic hyperactivity. Accordingly, renal denervation may also benefit other organs and bodily structures innervated by sympathetic nerves, including those identified in FIG. 5. For example, as previously discussed, a reduction in central sympathetic drive may reduce the insulin resistance that afflicts people with metabolic syndrome and Type II diabetics. Additionally, patients with osteoporosis may also be sympathetically activated and might also benefit from the down regulation of sympathetic drive that accompanies renal denervation.

As will be described in greater detail later, the renal artery may be accessed by percutaneously inserting a needle at the skin, through the abdominal muscles, peritoneum, and associated fascia, and to the renal plexus of the renal artery. Intravascular renal arterial access may be challenging, for example, because as compared to some other arteries that are routinely accessed using catheters, the renal arteries are often extremely tortuous, may be of relatively small diameter, and/or may be of relatively short length. Furthermore, renal arterial atherosclerosis is common in many patients, particularly those with cardiovascular disease. Renal arterial anatomy also may vary significantly from patient to patient, which further complicates minimally invasive access. Significant inter-patient variation may be seen, for example, in relative tortuosity, diameter, length, and/or atherosclerotic plaque burden, as well as in the take-off angle at which a renal artery branches from the aorta. Further, some patients include multiple left renal arteries and/or right renal arteries. In addition to complicating renal arterial access, specifics of the renal anatomy also complicate establishment of stable contact between a neuromodulatory apparatus and a luminal surface or wall of a renal artery. For example, navigation can be impeded by the tight space within a renal artery, as well as tortuosity of the artery. Furthermore, establishing consistent contact is complicated by patient movement, respiration, and/or the cardiac cycle because these factors may cause significant movement of the renal artery relative to the aorta, and the cardiac cycle may transiently distend the renal artery (i.e., cause the wall of the artery to pulse).

In contrast, direct percutaneous access to the renal artery may be capable of accessing such renal arteries without accounting for such tortuous vasculature, and may do so in less time, reducing an amount of movement of the renal artery. For example, direct percutaneous access may be performed without general anesthesia in a non-surgical environment, such as an office, and may use a relatively low level of consumables (e.g., injection needle 116 and adhesive patch 110) compared to catheter-based renal denervation techniques.

Figure 7A:
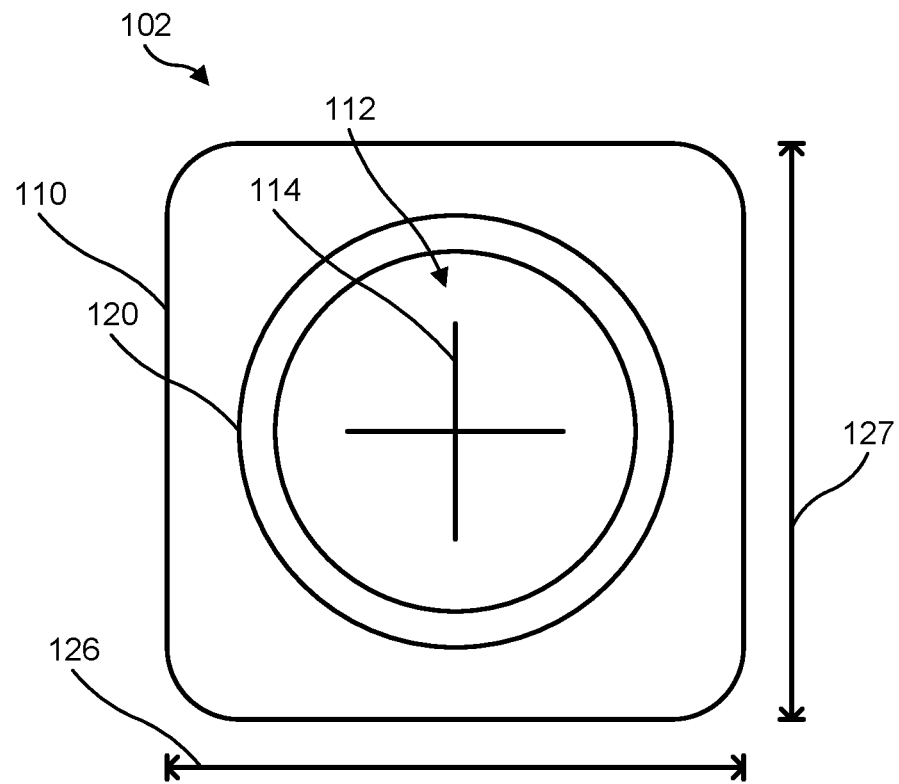
FIG. 7A is a top view conceptual diagram of an example medical device assembly that includes an adhesive patch and a tracking assembly, in accordance with some examples of the disclosure.
Figure 7B:
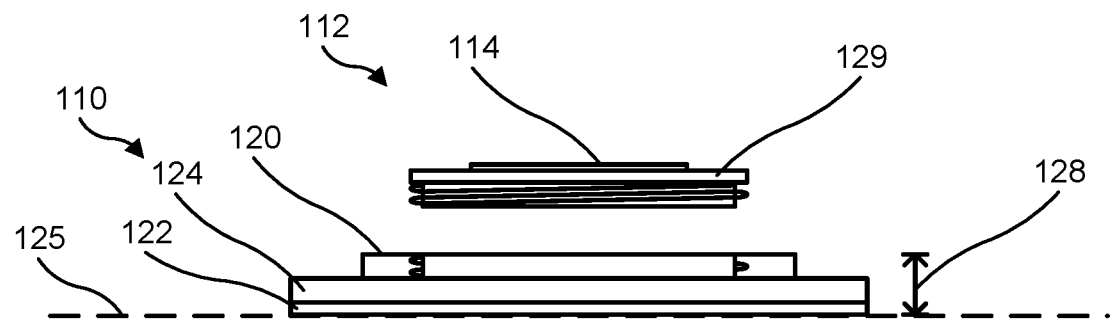
FIG. 7B is a side view conceptual diagram of the example medical device assembly of FIG. 7A.

FIGS. 7A and 7B are respective top and side view conceptual diagrams of an example medical device assembly that includes an adhesive patch and a tracking assembly, in accordance with some examples of the disclosure. Medical device assembly 102 has a depth 128, a width 126, and a length 127; however, in other examples, medical device assembly 102 may have a diameter or other measure of length. In some examples, medical device assembly 102 may be relatively small and/or thin, such that medical device assembly 102 may remain on a patient with relatively little movement inhibition. As one example, medical device assembly 102 may have a surface area less than about 100 square centimeters. As another example, medical device assembly 102 may have a maximum dimension (e.g., width 126, length 127, diameter, etc.) that is less than about 10 centimeters. As another example, medical device assembly may have depth 128 that is less than about 1 centimeter.

Medical device assembly 102 includes a coupling assembly 120 coupled to adhesive patch 110. Coupling assembly 120 is configured to couple to one or more functional assemblies. In the example of FIGS. 2A and 2B, tracking assembly 112 is removably coupled to coupling assembly 120. In other examples, such as will be shown in FIGS. 9A-9D and 10A-10B, other functional assemblies, such as a guide assembly 140 or 170 and/or an actuator assembly 200 may be coupled to coupling assembly 120. Coupling assembly 120 may include any of a variety of coupling mechanisms configured to couple a functional assembly to adhesive patch 110 including, but not limited to, a screw mechanism (such as shown in FIGS. 7A and 7B), a clipping mechanism, a tack mechanism, a magnetic mechanism, and the like.

Coupling assembly 120 may be configured to permit attachment and removal of a functional assembly and/or securely fix the coupled functional assembly to medical device assembly 102. As one example, attachment and removal of tracking assembly 112 may permit removal of tracking assembly 112 once imaging of medical device assembly 102 is complete, such that medical device assembly 102 may have a smaller form factor or weight for longer-term use. As another example, attachment of a guide assembly or actuation assembly to coupling assembly 120 may stabilize the guide or actuation assembly against medical device assembly 102, such that the guide or actuation assembly may more accurately guide or injection the injection needle along the insertion path. In some examples, coupling assembly 120 may be configured such that, even without an attached functional assembly, a patient may wear medical device assembly 102 for an extended period of time without interference in daily life. As one example, coupling assembly 120 may be relatively thin, such as less than about 0.5 centimeters. As another example, a bottom surface of coupling assembly 120 may be contoured, or configured to be contoured, to a shape of the outer surface of the patient proximate to the treatment site. For example, the bottom surface may be contoured to match curvature of a mid-back of a patient proximate to the kidneys of the patient.

In some examples, adhesive patch 110 includes a plurality of layers; in the example of FIG. 7B, adhesive patch 110 includes an adhesive layer 122 and a backing layer 124. Adhesive layer 122 may be configured to adhere medical device assembly 102 to an outer surface of the patient. In some examples, adhesive layer 122 is configured to adhere to the outer surface of the patient for at least two weeks. A variety of materials may be used for adhesive layer 122 including, but not limited to, acrylic, rubber, silicone, or the like. Backing layer 124 may be configured to provide a supportive backing for adhesive layer 122. A variety of materials may be used for backing layer 124 including, but not limited to, polyester, polyethylene, polyurethane, silicone, or the like. In some examples, backing layer 124 may be configured as an injection pad to support an entry point of the distal end of the injection needle. For example, backing layer 124 may include a foam or other material configured to permit repeated insertion of the injection needle for subsequent procedures or configured to seal or contain bodily fluids after a procedure without removing medical device assembly 102 from the patient.

Figure 8A:
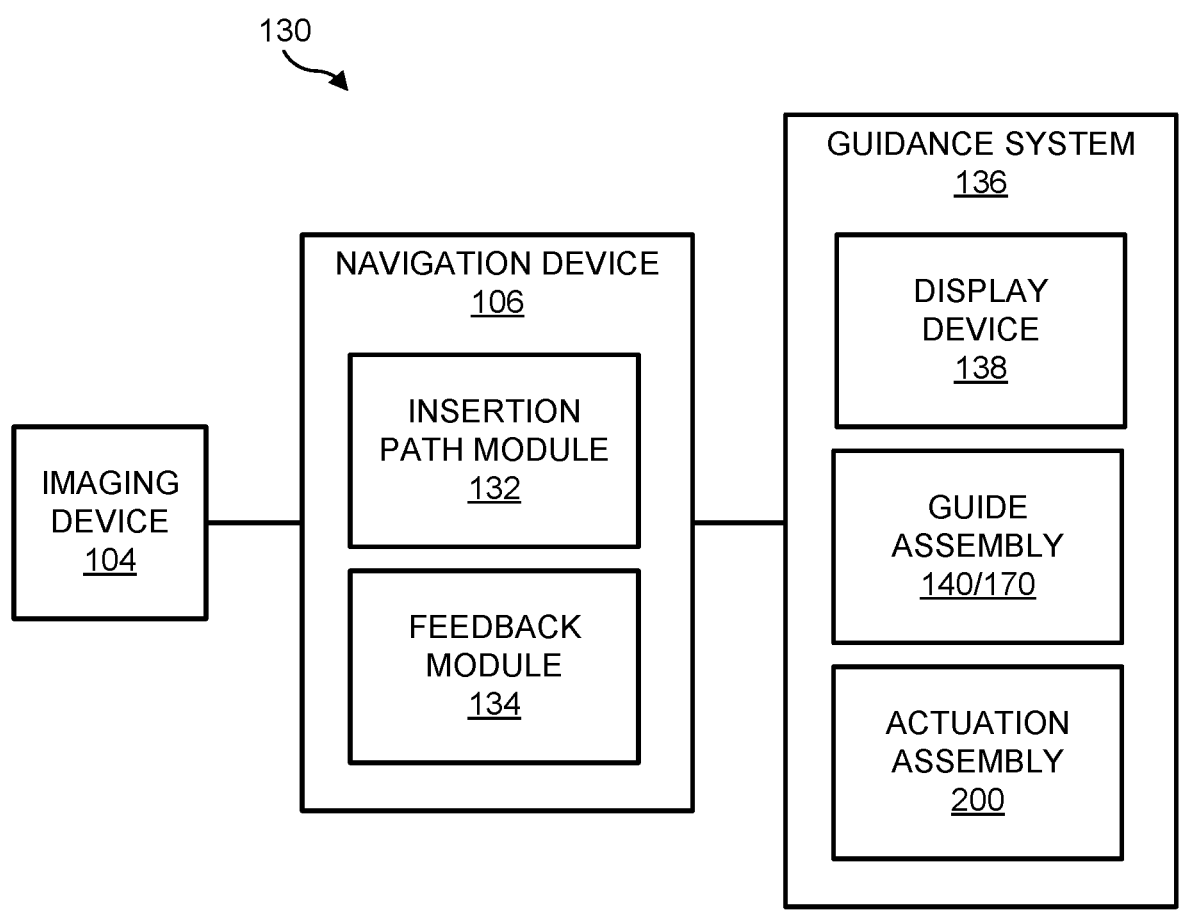
FIG. 8A is a conceptual diagram of an example imaging and navigation assembly that includes an imaging device and a navigation device, in accordance with some examples of the disclosure.

Medical device assembly 102 may be used as an aid in part of a percutaneous medical device navigation system for imaging a relative position between medical device assembly 102 and a treatment site of the patient and navigating an injection needle to the treatment site. FIG. 8A is a conceptual diagram of an example medical device navigation system 130 that includes an imaging device 104, a navigation device 106, and a guidance system 136, in accordance with some examples of the disclosure.

Guidance system 136 may include a variety of devices, assemblies, or systems configured to guide, or provide guidance for, inserting injection needle 116. In the example of FIG. 8A, guidance system 136 includes a display device 138, a guide assembly 140/170 (further described in FIGS. 9A-9D), and an actuation assembly 200 (further described in FIGS. 10A-10B). Display device 138 may include any display device configured to display images to a user, such as a clinician, for guiding injection needle 116 along insertion path 118. Guide assembly 140/170 may include any device configured to augment control of injection needle 116 prior to or during insertion of injection needle 116. Actuator assembly 200 may include any device configured to control injection needle 116 during insertion of injection needle 116.

Navigation device 106 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. Navigation device is communicatively coupled to imaging device 104 and guidance system 136. Navigation device 106 is configured to receive one or more images from imaging device 104. The one or more images indicate a relative position between the one or more reference markers of medical device assembly 102 and a treatment site in the patient.

Navigation device 106 includes an insertion path module 132. Insertion path module 132 is configured to determine, based on the one or more images, a percutaneous insertion path 118 for an injection needle 116 from an insertion point at medical device assembly 102 to the treatment site of the patient. Insertion path 118 represents a desired insertion path 118 of injection needle 116, and may be determined to guide, or provide guidance for, inserting injection needle 116 to the treatment site.

In some examples, insertion path module 132 is configured to determine insertion path 118 based on user selected positions. For example, insertion path module 132 may be configured to generate a visual representation of an area or volume of a patient from the one or more images and display the visual representation as a user interface on a display, such as display device 138. A clinician may indicate, via a user input, a portion of the visual representation that corresponds to a desired treatment site and a portion of the visual representation that corresponds to a desired insertion point. Insertion path module 132 may receive the indications of the portions and determine an insertion path 118 that links the treatment site and the insertion point.

In some examples, insertion path module 132 is configured to determine insertion path 118 based on determined positions. Insertion path module 132 may be configured to generate a representation of a volume of a patient from the one or more images and qualitatively identify one or more regions of the representation that correspond to tissues in the patient. For example, insertion path module 132 may be configured to differentiate various tissues based on the one or more images, alone or with input from a clinician, and identify tissues that may correspond to the treatment site, such as one or more renal nerves or tissues indicative of renal nerves (e.g., perivascular adipose tissue), tissues that may correspond to impassable or difficult to pass organs (e.g., bones or cartilage), or tissues that may correspond to a desired insertion point (e.g., near medical device assembly 102). Insertion path module 132 may be configured to select the desired treatment site (e.g., to target the desired tissue), select the desired insertion path (e.g., to insert injection needle 116 more easily and/or reduce recovery time), and/or select the desired insertion point (e.g., to improve insertion of injection needle 116).

In some examples, insertion path module 132 is configured to determine insertion path 118 based on an anticipated position of a guide assembly or actuation assembly, such as guide assembly 140/170 or actuation assembly 200. For example, guide assembly 140/170 or actuation assembly 200 may not have full range of both spatial and angular control and/or may be coupled to medical device assembly 102. Insertion path module 132 may be configured to select the treatment site, such as through user selection or determination by insertion path module 132, and determine insertion path 118 between a control point on guide assembly 140/170 or actuation assembly 200. For example, as will be described in FIGS. 9A-9D and 10A-10B below, guide assembly 140/170 and actuation assembly 200 may include channels or actuators that pivot across a plane with a fixed position or move along a plane with a fixed orientation. Insertion path module 132 may use the channel fixed orientation, channel fixed position/pivot point, or actuator fixed position to determine insertion path 118 from the corresponding control point to the treatment site.

Insertion path module 132 is configured to determine one or more parameters corresponding to percutaneous insertion path 118. The one or more parameters may be configured to characterize insertion path 118, such that a clinician or guidance system may use the parameters to guide injection needle 116 along insertion path 118. For example, insertion path 118 may have an orientation and a depth relative to a plane of medical device assembly 102 that may be expressed in a variety of coordinate systems, such as a spherical coordinate system and/or cartesian coordinate system. In some examples, the one or more parameters may correspond to a particular coordinate system used to guide or control injection needle along insertion path 118. As one example, as will be illustrated in FIGS. 9A-9B and 10A-10B, the orientation of insertion path 118 may be expressed in spherical coordinates, such that the one or more parameters may include an azimuthal angle along the plane and a polar angle from the plane. As another example, as will be illustrated in FIGS. 9C-9D, the orientation of insertion path 118 may be expressed in cartesian coordinates, such that the one or more parameters may include an x-axis position and a y-axis position along the plane.

Insertion path module 132 is configured to output one or more parameters corresponding to percutaneous insertion path 118. Insertion path module 132 may be configured to output the one or more parameters in a form that is useful for guidance system 136. In some examples, insertion path module 132 may output the one or more parameters to a storage device for use at a later time, such as for subsequent procedures. In some examples, insertion path module 132 may output the one or more parameters to guidance system 136 for use in a current procedure.

In some examples, insertion path module 132 may be configured to output a display signal configured to display a representation of the one or more parameters. As one example, insertion path module 132 may be configured to output instructions to display device 138 to display numerical values for the one or more parameters. For example, display device 138 may provide on-screen instructions or numerical values to a clinician as to an insertion point of insertion path 118, an orientation of insertion path 118, and an insertion depth of injection needle 116, such that the clinician may insert injection needle 116, adjust guide assembly 140/170, or operate actuation assembly 200 according to the displayed instructions or numerical values. As another example, insertion path module 132 may be configured to output instructions to display device 138 to display a visual representation of insertion path 118 within the patient. For example, insertion path module 132 may overlay the determined insertion path 118 on a visual representation of based on the one or more images received by imaging device 104.

In some examples, insertion path module 132 may be configured to output a control signal configured to control guide assembly 140/170 or actuation assembly 200 according to the one or more parameters. For example, guide assembly 140/170 or actuation assembly 200 may include one or more actuators configured to manipulate orientation or movement of injection needle 116 in response to control signals. Insertion path module 132 may be configured to output control signals that control orientation and movement of injection needle 116 according to the orientation and insertion depth of insertion path 118.

Navigation device 106 may include a feedback module 134. Feedback module 134 may be configured to determine and output feedback to guidance system 136 as to whether an actual insertion path of injection needle 116 is aligned with the determined insertion path 118. In some examples, feedback module 134 may be used to position guidance system 136 prior to inserting injection needle 116. As one example, prior to inserting injection needle 116, the clinician may adjust an orientation and/or position of guide assembly 140/170, such that a channel of guide assembly aligns with insertion path 118. Feedback module 134 may be configured to receive an indication of an orientation and/or position of an insertion path defined by guide assembly 140/170, such as from one or more sensors on guide assembly 140/170, and compare the orientation and/or position of the insertion path defined by guide assembly 140/170 with an orientation and/or position of a desired insertion path 118. Feedback module 134 may be configured to determine one or more adjustments to the orientation and/or position of the insertion path defined by guide assembly 140/170 and output an indication of the one or more adjustments to guidance system 136, such as to a display device 138 (e.g., indicating an adjustment to one or more parameters) or to an actuator (e.g., controlling an adjustment to one or more parameters).

In some examples, feedback module 134 may be used to provide guidance to a clinician during insertion of injection needle 116. For example, during insertion of injection needle, the injection needle 116 may travel along an insertion path that deviates from a desired insertion path 118. Feedback module 134 may be configured to receive an indication of an orientation or insertion depth of injection needle 116, such as an image of a position of injection needle 116 from imaging device 104 or an indication of the orientation or injection depth of injection needle 116 from a sensor on guide assembly 140/170, and compare the orientation and/or injection depth of injection needle to the desired insertion path 118. Feedback module 134 may be configured to determine one or more adjustments to the orientation and/or insertion depth of the insertion path controlled by the clinician or defined by the guide assembly 140/170 and output an indication of the one or more adjustments to guidance system 136, such as to a display device 138.

In some examples, feedback module 134 may be used to control insertion of injection needle 116 by actuator assembly 200. Feedback module 134 may be configured to receive an indication of an orientation or insertion depth of injection needle 116, such as an indication of the orientation or injection depth of injection needle 116 from a sensor or actuator on actuation assembly 200, and compare the orientation and/or injection depth of injection needle to the desired insertion path 118. Feedback module 134 may be configured to determine one or more adjustments to the orientation and/or insertion depth of the insertion path controlled by actuator assembly 200 and output instruction that include an indication of the one or more adjustments to actuator assembly 200.

In some examples, feedback module 134 may be used to determine various characteristics or conditions of an environment of injection needle 116, such as a position of injection needle 116 based on a composition of surrounding tissues or an extent of ablation of the renal nerves. As one example, injection needle 116 may be configured to operate as an impedance electrode to detect an impedance or change in impedance of the one or more tissues. Injection needle 116 may include an insulated portion and uninsulated electrode portion, and may be coupled to a nerve stimulator. The nerve stimulator may deliver an electrical signal to the tissues via the uninsulated electrode portion of injection needle 116. The tissues may produce differing impedances in response to the electrical signal. For example, an impedance response for a particular tissue may be dependent on variations in a composition of the tissue, such as water or lipid content. Injection needle 116 may detect the impedance or change in impedance in response to the electrical signal. This detected impedance or change in impedance may indicate whether injection needle 116 is positioned at or near tissues likely to include a renal nerve, such as fatty tissues. As another example, injection needle 116 may be configured to operate as an electrical stimulation electrode to electrically stimulate the renal nerves to probe a hemodynamic response of the renal nerves. For example, following injection of a chemical agent, injection needle 116 may deliver an electrical signal to sympathetic fibers of the renal artery to attempt to stimulate a physiological response of the renal artery, such as blood pressure, heart rate, and presence of plasma epinephrine or norepinephrine. This physiological response may indicate an extent to which the renal nerves have been ablated.

Figure 8B:
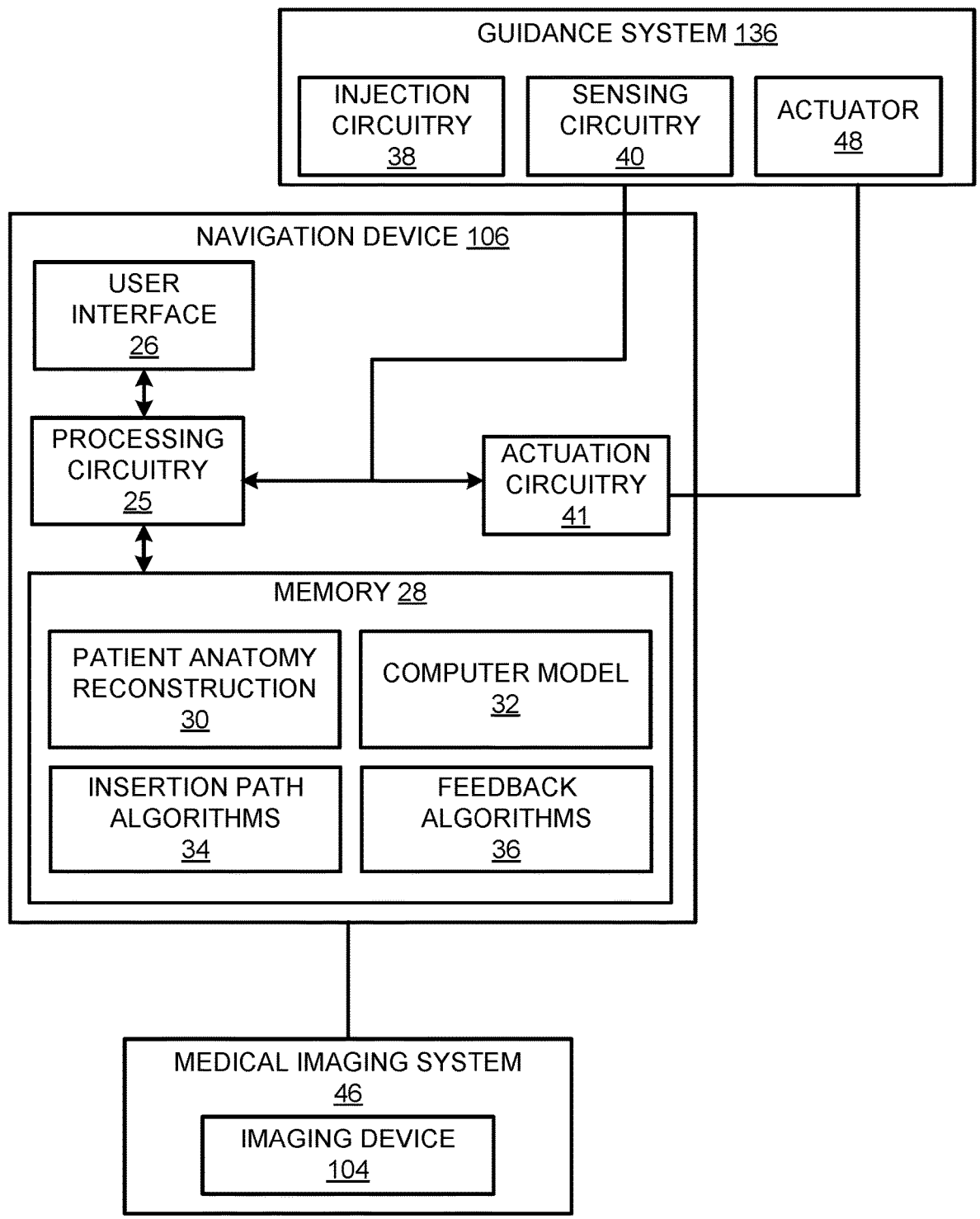
FIG. 8B is a schematic and conceptual illustration of an example navigation device coupled to a medical imaging system and a guidance system, in accordance with some examples of the disclosure.

FIG. 8B is a schematic and conceptual illustration of example navigation device 106 coupled to a medical imaging system 46 and example guidance system 136. While various circuitries, algorithms, modules, and functions are described with reference to navigation device 106 of FIG. 8B, in other examples, guidance system 136, or another medical device may include features and perform functions described with reference to navigation device 106.

Navigation device 106 includes processing circuitry 25, a user interface 26, and a memory 28. Memory 28 includes computer-readable instructions that, when executed by processing circuitry 25, causes navigation device 106 to perform various functions. Processing circuitry 25 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 25 herein may be embodied as software, firmware, hardware or any combination thereof.

Memory 28 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Memory 28 may store any suitable information, including patient identification information, and information for navigating needle 116 with which guidance system 136 provide guidance. For example, memory 28 may store one or more of patient anatomy reconstruction 30, computer model 32, insertion path algorithms 34 (e.g., corresponding to insertion path module 132), feedback algorithms 36 (e.g., corresponding to feedback module 134), and operating instructions in separate memories within memory 28 or separate areas within memory 28.

In some examples, guidance system 136, such as guide assembly 140/170 or actuation assembly 200 of FIG. 8A, may be configured to receive one or more parameters corresponding to an insertion path of injection needle 116, and provide feedback as to an orientation and/or position of injection needle 116 specified by the one or more parameters. In some examples, guidance system 136 may include sensing circuitry 40 coupled to injection needle 116, guide assembly 140/170, and/or actuation assembly 200, for example, to receive electrical measurements, feedback, or signals, for example, position.

In some examples, guidance system 136, such as actuation assembly 200 of FIG. 8A, may be configured to receive one or more parameters corresponding to an insertion path of injection needle 116, and control an orientation, position, and/or injection rate of injection needle 116 specified by the one or more parameters. In some examples, navigation device 106 and guidance system 136 may include one or both of actuation circuitry 41 or actuator 48 ultimately coupled to injection needle 116 to control one or more of movement, location, or orientation of injection needle 116 along the insertion path. For example, actuator 48 may include a stepper motor, a servo motor, or suitable motor, or magnetic rail, or any other suitable mechanism for advancing, retracting, rotating, and repositioning injection needle 116 along the insertion path. Actuation circuitry 41 may control operation of actuator 48, for example, by amplifying or sending control signals from navigation device 106 to actuator 48. In some examples, actuation circuitry 41 may receive feedback signals from actuator 48 and/or sensing circuitry 40 indicative of a current position or orientation of injection needle 116, and freedom of or resistance to movement of injection needle 116, and may send such feedback signals to processing circuitry 25 for ultimately controlling the movement and position of injection needle 116.

In some examples, guidance system 136, such as actuation assembly 200, may be configured to receive one or more parameters corresponding to therapy delivery by injection needle 116, and control injection circuitry 38 to deliver the therapy, such as a chemical agent via injection needle 116, such as according to an injection rate or injection volume. Injection circuitry 38 may be communicatively coupled to a pump or other injection apparatus configured to cause a chemical agent to flow through injection needle 116.

A user, such as a clinician, may interact with processing circuitry 25 through user interface 26. User interface 26 may include a display, such as a liquid crystal display (LCD), light-emitting diode (LED) display, or other screen, to present information related to stimulation therapy, and buttons or a pad to provide input to navigation device 106. In examples in which user interface 26 requires a 3D environment, the user interface may support 3D environments such as a holographic display, a stereoscopic display, an autostereoscopic display, a head-mounted 3D display, or any other display that is capable of presenting a 3D image to the user. Buttons of user interface 26 may include an on/off switch, plus and minus buttons to zoom in or out or navigate through options, a select button to pick or store an input, and pointing device, e.g. a mouse, trackball, or stylus. Other input devices may be a wheel to scroll through options or a touch pad to move a pointing device on the display. In some examples, the display may be a touch screen that enables the user to select options directly from the display screen.

In some examples, navigation device 106 may include a telemetry module that may support wired or wireless communication between programmer 24 and generator 14 or another computing device under the control of processing circuitry 25. A clinician or another user may interact with navigation device 106 to generate an insertion path for navigating injection needle 116. Navigation device 106 may be used to present anatomical regions, including an insertion path, to the clinician via user interface 26, select the insertion path, generate or modify a new insertion path by manipulating computer model 32 or one or more positions of an insertion point, a target tissue, or other input parameter, and communicate the selected insertion path to guidance system 136.

In some examples, navigation device 106 may be communicatively coupled to medical imaging system 46, including imaging device 104, or may otherwise receive one or more medical images of a patient from medical imaging system 46. Medical imaging system 46 may include medical device 102 configured to generate a medical image of a region of a patient that includes a target tissue (e.g., intended to be denervated). One or more medical images generated by medical imaging system 46 may be stored by navigation device 106 in memory 28, or otherwise used by processing circuitry 25, to generate patient anatomy digital reconstruction 30. The medical image can be any medical image that provides sufficient resolution for identifying the tissue regions to avoid (for example, particular muscles, lymph nodes, other blood vessels veins/arteries, the kidney itself, the digestive tract, or other anatomical features or tissue).

In some cases, memory 28 of navigation device 106 or another device (e.g., a remote device) may store a plurality of medical images of a patient, which can be, for example, a plurality of medical images of the same or nearly the same region of the patient. In some cases, if there has been a relatively large gap of time between denervation therapy sessions (e.g., on the order of weeks, months, or even years), a clinician may elect to use medical imaging system 46 to generate one or more updated medical images of the patient or otherwise obtain updated medical images of the patient, and update the insertion path used by guidance system 136 based on the one or more updated medical images. In some examples, the plurality of medical images may include any suitable available medical images of the patient region, for example, images obtained of the patient region obtained for a therapy other than denervation therapy. There may be changes to a particular patient's anatomy and/or tissue characteristics over time, such as due to weight gain, weight loss, or the like.

In some examples, medical imaging system 46 includes at least one of a fluoroscopy system, a computer aided tomography (CAT) scan system, a magnetic resonance imaging (MRI) system, a positron emission tomography (PET) scan system, an electrical impedance tomography (EIT) system, an ultrasound system, or an optical imaging system. In some examples, EIT may be used to identify the gross location of extravascular structures like nerves, fat, kidney veins, and the like. In some examples, locating these or other structures in three-dimensional space, for example, by EIT, may improve digital reconstruction 30 or computer model 32. Processing circuitry 25 may be configured to develop computer model 32 based on patient anatomy reconstruction 30. In some examples, computer model 32 includes a finite element model. In some examples, digital reconstruction 30 includes a three-dimensional (3D) reconstruction. Processing circuitry 25 may use one or both of digital reconstruction 30 or computer model 32 to determine an insertion path, as described with reference to FIGS. 8A, 11A, 11B, 12, 13, and 14. Processing circuitry 25 may further also be used to control navigation by guidance system 136 based on the insertion path.

As mentioned above, the one or more parameters may be used by a guidance system to guide an injection needle along an insertion path. In some examples, the guidance system may include a guide assembly configured to define an orientation of a percutaneous insertion path of the injection needle according to the one or more parameters. For example, the guide assembly may include a channel for receiving the injection needle and a positioning mechanism for positioning the orientation of the injection needle along the insertion path. A clinician may position the positioning system according to the one or more parameters determined by navigation device 106 such that the channel of the guide assembly aligns with the insertion path and advance the injection needle to a predetermined and/or imaged depth. In this way, the guide assembly may provide a relatively inexpensive mechanism that enables a clinician to quickly and accurately insert the injection needle along the insertion path.

Figure 9A:
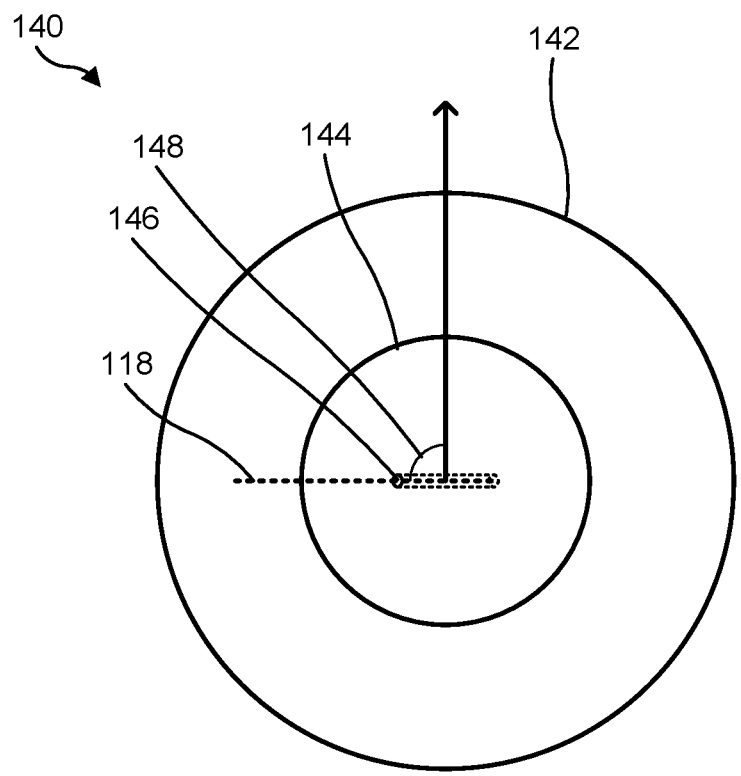
FIG. 9A is a top view conceptual diagram of an example guide assembly that includes a ball and socket configuration, in accordance with some examples of the disclosure.
Figure 9B:
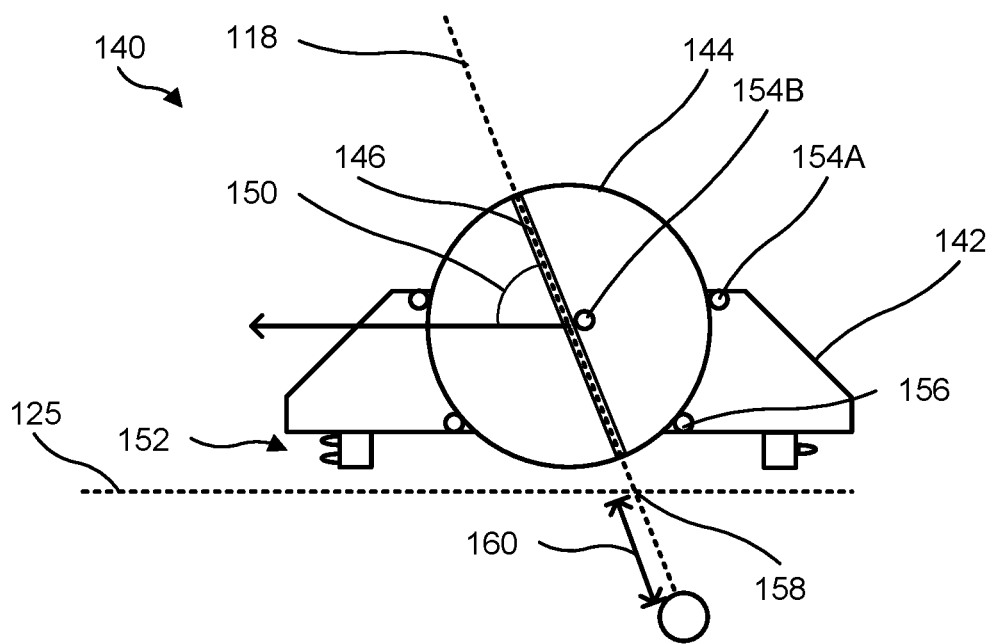
FIG. 9B is a side view conceptual diagram of the example guide assembly of FIG. 9A.

Guide assemblies discussed herein may include a variety of configurations. FIGS. 9A and 9B are top view and side view conceptual diagrams of an example guide assembly 140 that includes a ball and socket configuration, in accordance with some examples of the disclosure. Guide assembly 140 is configured to define an orientation of insertion path 118. Guide assembly 140 includes a socket frame 142 and a ball guide 144 positioned in socket frame 142 to permit movement of ball guide 144 along three axes, such as on one or more bearings 156. Ball guide 144 includes a through-channel 146 configured to receive an injection needle and guide the injection needle through ball guide 144. In some examples, through-channel 146 has a diameter that is substantially equal to a diameter of the injection needle, such as within about 100 micrometers. While not shown, guide assembly 140 may include one or more locking features configured to secure ball guide 144 to socket frame 142. In some examples, guide assembly 140 may include one or more adjustment features configured to tune the relative orientation of ball guide 144.

Guide assembly 140 is configured to define the orientation of insertion path 118 according to a spherical coordinate system, including an azimuthal angle 148 and a polar angle 150. Azimuthal angle 148 may define an angle of insertion path 118 in a plane 125 of adhesive patch 110 (not shown) from a reference direction, such as an axis of a patient. Polar angle 150 may define an angle of insertion path 118 from plane 125 of adhesive patch 110 (not shown). Azimuthal angle 148 and polar angle 150 may define an insertion point 158 from which a treatment site is at a depth 160.

In some examples, guide assembly 140 may include a coupling track 152 configured to couple to a coupling assembly, such as coupling assembly 120 of FIGS. 7A and 7B. Coupling track 152 may be configured to interface with the coupling mechanism of coupling assembly 120 to secure guide assembly 140 to adhesive patch 110 and, correspondingly, to the patient. For example, once secured, guide assembly 140 may be fixed to prohibit movement.

In some examples, guide assembly 140 includes one or more sensors 154A configured to detect the orientation of ball guide 144 and, accordingly, the orientation of insertion path 118. As one example, sensors 154A may be configured to detect a particular relative orientation of ball guide 144 with respect to socket frame 142, such as according to a track having various defined positions. This relative orientation may correspond to a particular azimuthal angle 148 and a particular polar angle 150 of insertion path 118. As another example, sensors 154A may be configured to detect relative movement of ball guide 144 with respect to socket frame 142 from a reference position, such as a default position or a position determined during calibration. This relative movement may indicate an azimuthal angle 148 and a polar angle 150 from the reference position. Prior to or during positioning of ball guide 144 within socket frame 142, sensors 154A may detect the relative orientation and/or relative movement and send a feedback signal to navigation device 106 indicating the orientation of insertion path 118.

In some examples, guide assembly 140 may include one or more sensors 154B configured to detect an insertion depth of the injection needle through channel 146 and, according, the depth of the injection needle along insertion path 118. As one example, sensors 154B may be configured to detect a particular relative position of the injection needle with respect to channel 146, such as according to a track having various defined axial positions. As another example, sensors 154B may be configured to detect relative movement of the injection needle with respect to channel 146 from a reference position, such as a default position or a position determined during calibration. Prior to or during insertion of the injection needle, sensors 154B may detect the relative position and/or relative movement and send a feedback signal to navigation device 106 indicating the insertion depth of the injection needle.

Figure 9C:
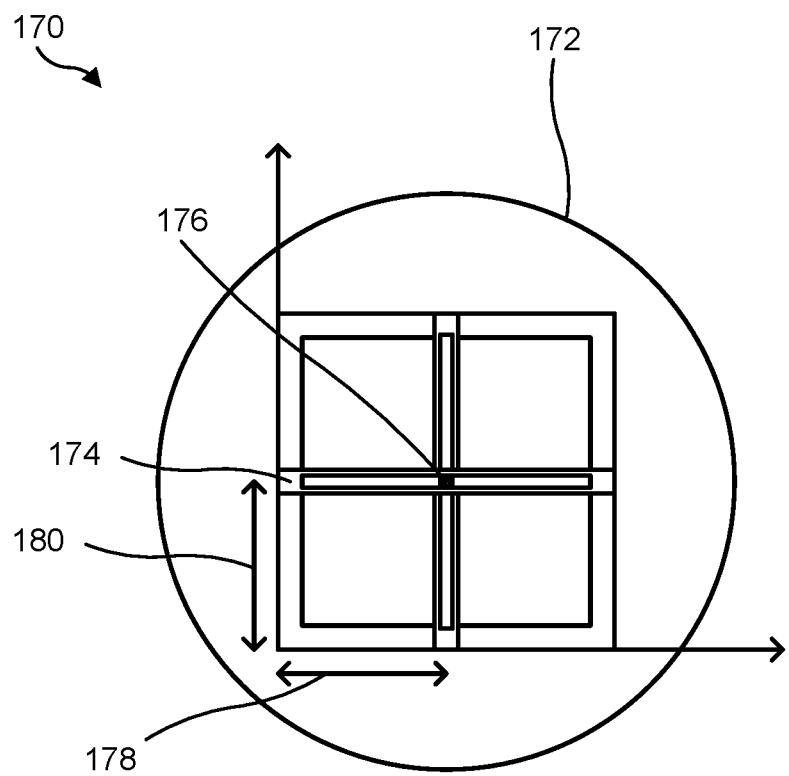
FIG. 9C is a top view conceptual diagram of an example guide assembly that includes a movable planar frame configuration, in accordance with some examples of the disclosure.
Figure 9D:
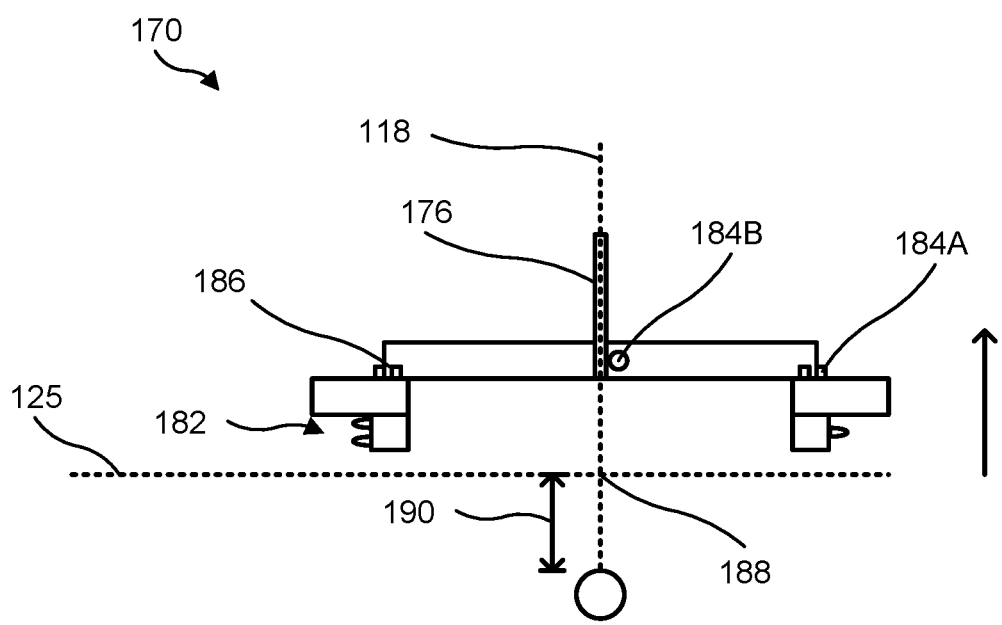
FIG. 9D is a side view conceptual diagram of the example guide assembly of FIG. 9C.

FIGS. 9C and 9C are top view and side view conceptual diagrams of an example guide assembly 170 that includes a movable planar frame configuration, in accordance with some examples of the disclosure. Guide assembly 170 is configured to define an orientation of insertion path 118. Guide assembly 170 includes a planar frame 172, an x-arm 174A moveable along an x-axis, and a y-arm 174B moveable along a y-axis to permit movement of arms 174 along two axes, such as two or more tracks 186. Arms 174 include a through-channel 176 configured to receive an injection needle and guide the injection needle through arms 174. In some examples, through-channel 176 has a diameter that is substantially equal to a diameter of the injection needle, such as within about 100 micrometers. While not shown, guide assembly 170 may include one or more locking features configured to secure arms 174 to planar frame 172. In some examples, guide assembly 170 may include one or more adjustment features configured to tune the positions of arms 174. In some examples, guide assembly 170 may include a coupling track 182 configured to couple to a coupling assembly, similar to coupling track 152 of guide assembly 140.

Guide assembly 170 is configured to define the orientation of insertion path 118 according to a cartesian coordinate system, including an x-axis position 178 and a y-axis position 180. X-axis position 178 may define an x-axis position of insertion path 118 in plane 125 of adhesive patch 110 (not shown). Y-axis position 180 may define y-axis position of insertion path 118 in plane 125 of adhesive patch 110 (not shown). X-axis position 178 and y-axis position 180 may define an insertion point 188 from which a treatment site is at a depth 190. Guide assembly 170 includes a z-axis position that is normal to plane 125; however, in other examples, guide assembly 170 may include a z-axis position that is not fixed, such as a ball-and socket configuration similar to guide assembly 140 of FIGS. 9A and 9B.

In some examples, guide assembly 170 includes one or more sensors 184A configured to detect the position of arms 174 and, accordingly, the position of insertion path 118 along plane 125. As one example, sensors 184A may be configured to detect a particular relative position of arms 174 with respect to planar frame 172, such as according to a track having various defined positions. This relative position may correspond to a particular x-axis position 178 and a particular y-axis position 180 of insertion path 118. As another example, sensors 184A may be configured to detect relative movement of arms 174 with respect to planar frame 172 from a reference position, such as a default position or a position determined during calibration. This relative movement may indicate an x-axis position 178 and a y-axis position 180 from the reference position. Prior to or during positioning of arms 174, sensors 184A may detect the relative position and/or relative movement and send a feedback signal to navigation device 106 indicating the position of insertion path 118 in plane 125.

In some examples, guide assembly 140 may include one or more sensors 154B configured to detect an insertion depth of the injection needle through channel 176 and, according, the depth of the injection needle along insertion path 118. For example, sensors 184B may operate with respect to channel 176 similar to how sensors 154B of guide assembly 140 operate with respect to channel 146.

In some examples, the guidance system may include an actuation assembly configured to guide an injection needle along a percutaneous insertion path according to the one or more parameters. For example, the actuation assembly may include one or more actuators to control the position of the injection needle along the insertion path. The actuation assembly may guide the injection needle according to the one or more parameters determined by navigation device 106 such that the actuation assembly aligns the orientation of the injection needle with the insertion path and advances the injection needle to a predetermined and/or imaged depth. In this way, the actuation assembly may provide an automated mechanism that enables a clinician to quickly and accurately insert the injection needle along the insertion path.

Figure 10A:
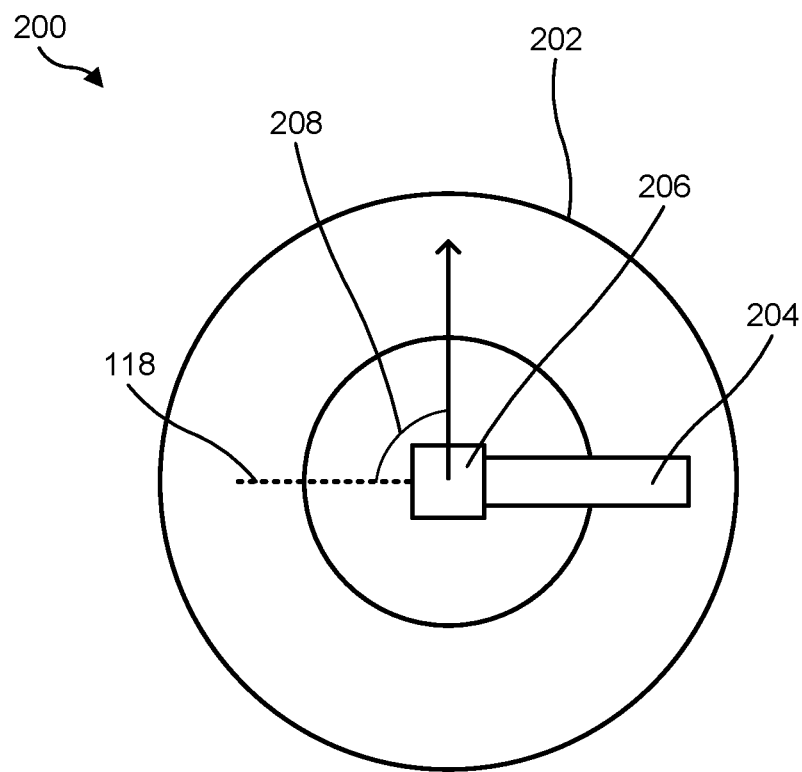
FIG. 10A is a top view conceptual diagram of an example actuation assembly, in accordance with some examples of the disclosure.
Figure 10B:
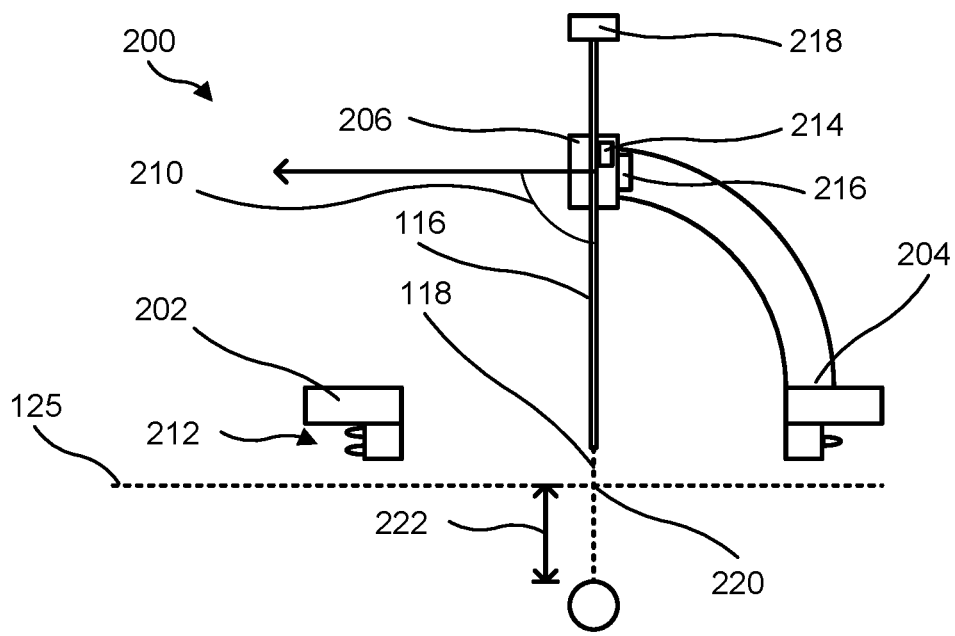
FIG. 10B is a side view conceptual diagram of the example actuation assembly of FIG. 10A.

Actuation assemblies discussed herein may include a variety of configurations. FIGS. 10A and 10B are top view and side view conceptual diagrams of an example actuation assembly 200, in accordance with some examples of the disclosure. Actuation assembly 200 is configured to control injection needle 116 along insertion path 118. Actuation assembly 200 includes an actuator frame 202 and an actuator arm 204 positioned on actuator frame 202 to position an injection actuator 206 and an orientation actuator 216 over a surface of the patient. While shown as fixed, in some examples, actuator arm 204 may be configured to move along one or more axes with respect to actuator frame 202. Orientation actuator 216 is configured to control an orientation of injection needle 116 along three axes. Injection actuator 206 may be configured to control a depth of insertion of injection needle 116. While described as different actuators, orientation actuator 216 and injection actuator 206 may be a same actuator, or may include multiple actuators that, collectively, perform the functions of defining an orientation and depth of insertion of injection needle 116. In some examples, injection actuator 206 and/or orientation actuator 216 may be controlled by a clinician. For example, actuation assembly 200 may include a user interface (not shown) configured to receive input from the clinician that indicates an orientation of orientation actuator 216 and/or a position or movement of injection actuator 206. In some examples, actuation assembly 200 may include a coupling track 212 configured to couple to a coupling assembly, similar to coupling track 152 of guide assembly 140.

In the example of FIGS. 10A and 10B, actuation assembly 200 is configured to control the orientation of insertion path 118 according to a spherical coordinate system, including an azimuthal angle 208 and a polar angle 210. Azimuthal angle 208 and polar angle 210 may be similar to azimuthal angle 148 and polar angle 150 of FIGS. 9A and 9B. However, in other examples, actuation assembly 200 may control an orientation of insertion path 118 according to other coordinate systems, such as a cartesian coordinate system. Azimuthal angle 208 and polar angle 210 may define an insertion point from which a treatment site is at a depth 220.

In some examples, guide assembly 140 includes one or more sensors 214 configured to detect the orientation of injection actuator 206 and, accordingly, the orientation of insertion path 118. As one example, sensors 214 may be configured to detect a particular relative orientation of injection actuator 206 with respect to actuator frame 202 and/or actuator arm 204, such as according to a feedback signal corresponding to an actuator position. This relative orientation may correspond to a particular azimuthal angle 208 and a particular polar angle 210 of insertion path 118. As another example, sensors 214 may be configured to detect relative movement of injection actuator 206 with respect to actuator frame 202 and/or actuator arm 204 from a reference position, such as a default position or a position determined during calibration. This relative movement may indicate an azimuthal angle 208 and a polar angle 210 from the reference position. Prior to or during insertion of injection needle 116, sensors 214 may detect the relative orientation and/or relative movement and send a feedback signal to navigation device 106 and/or a controller (not shown) indicating the orientation of insertion path 118.

In some examples, actuation assembly 200 may include one or more sensors 214 configured to detect an insertion depth of injection needle 116 along insertion path 118. As one example, sensors 214 may be configured to detect a particular relative position of injection needle 116 with respect to injection actuator 206, such as according to a feedback signal corresponding to an actuator position. As another example, sensors 214 may be configured to detect relative movement of injection needle 116 with respect to injection actuator 206 from a reference position, such as a default position or a position determined during calibration. During insertion of injection needle 116, sensors 214 may detect the relative position and/or relative movement of injection needle 116 and send a feedback signal to navigation device 106 and/or a controller (not shown) indicating the insertion depth of injection needle 116. In some examples, rather than or in addition to detecting an insertion depth of injection needle 116 with sensors 214, actuation assembly 200 may receive one or more insertion depth signals from imaging device 104 or other imaging device that may be actively or periodically monitoring a position of a distal tip of injection needle 116.

In some examples, sensors 214 may be configured to provide direct feedback to injection actuator 206 and/or orientation actuator 216 to control insertion of injection needle 116 along insertion path 118. For example, sensors 214 may send feedback signals to a controller (not shown) that indicate an orientation and/or injection depth of injection needle 116. The controller may be configured to compare the orientation and/or injection depth of injection needle 116 to an orientation and/or injection depth of insertion path 118, determine one or more adjustment signals for injection actuator 206 and/or orientation actuator 216, and send the adjustment signals to injection actuator 206 and/or orientation actuator 216. In some examples, rather than or in addition to sending the feedback signals to a controller, sensors 214 may be configured to send the feedback signals to navigation device 106 and receive adjustment signals from navigation device 106.

In some examples, actuation assembly 200 may include a chemical agent injection assembly 218 configured to inject chemical agent into the treatment site of the patient. For example, chemical agent injection assembly 218 may include a pump or other pressure source configured to inject the chemical agent through the lumen of injection needle 116 to the treatment site of the patient.

Figure 11A:
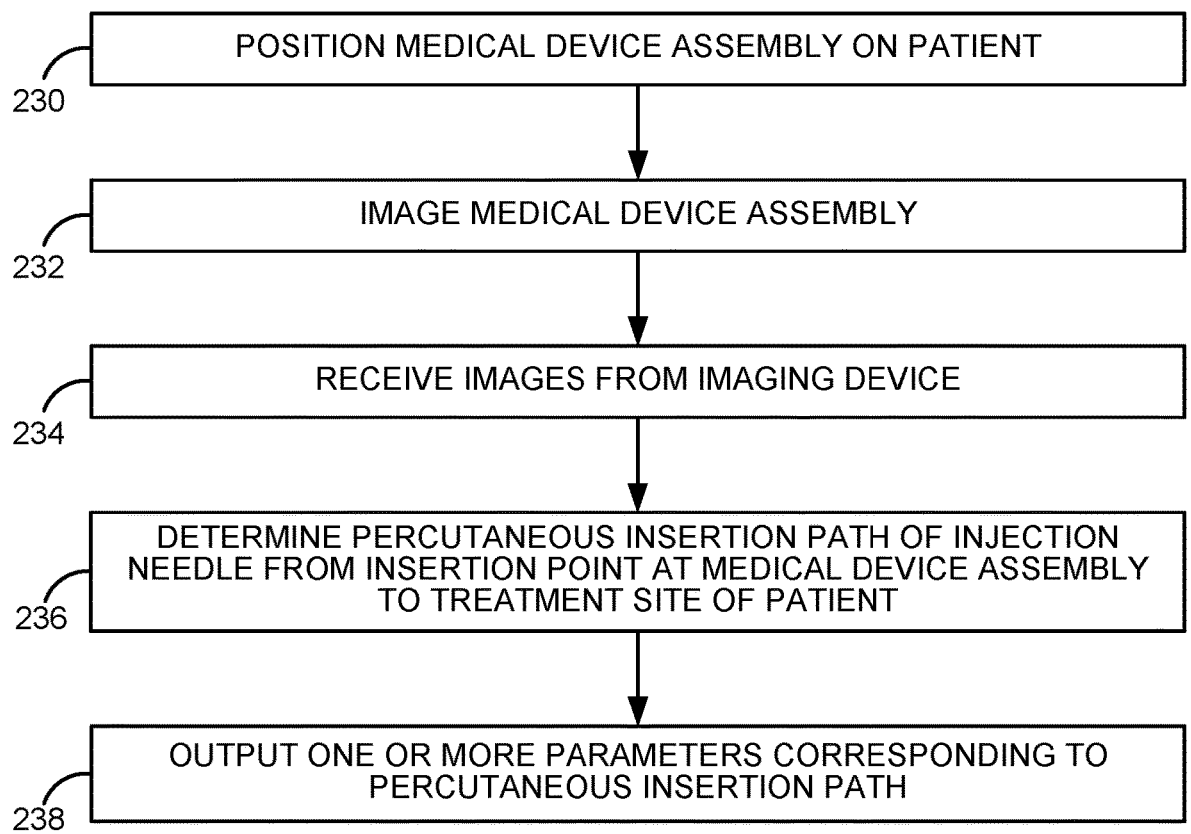
FIG. 11A is a flow diagram illustrating an example technique for determining an insertion path of medical device for performing neuromodulation of renal nerves, in accordance with some examples of the disclosure.

FIG. 11A is a flow diagram illustrating an example technique for determining a percutaneous insertion path of an injection needle using a medical device assembly, in accordance with some examples of the disclosure. The example technique of FIG. 11A will be described with respect to medical device navigation systems 100 and 130 of FIGS. 1 and 8, respectively; however, the technique of FIG. 11A may be used for other medical device navigation systems.

The method includes positioning medical device assembly 102 on the patient (230). For example, a clinician may position medical device assembly 102 on the skin of the patient. In some instances, the clinician may position medical device assembly 102 near the treatment site, within a direct line of penetrable tissues of the treatment site, and/or on a surface of the patient that is unlikely to affect an orientation of medical device assembly 102 for the duration that medical device assembly 102 is on the patient.

The method includes imaging, by imaging device 104, the medical device assembly to generate one or more images (232). For example, during imaging for an initial procedure, the clinician may capture one or more images for determining insertion path 118. As another example, during imaging for subsequent procedures, the clinician may only capture one or more images to verify an orientation of medical device assembly 102, such as if a guidance system used to guide or control insertion of injection needle 116 is not directly coupled to medical device assembly 102 or if anatomical changes in the patient may have shifted a position of medical device assembly 102 relative to the treatment site.

The method includes receiving, by navigation device 106 and from imaging device 104, one or more images (234). The one or more images indicate a relative position between one or more reference markers 114 on medical device assembly 102 positioned on the patient and a treatment site in the patient. For example, the clinician may capture one or more images that indicate a relative orientation (e.g., angle from plane 125) of the treatment site from medical device assembly 102 and a depth of the treatment site from medical device assembly 102, such as at least one image normal to plane 125 and at least one image along plane 125.

The method includes determining, by navigation device 106 and based on the one or more images, percutaneous insertion path 118 for injection needle 116 from an insertion point to the treatment site of the patient (236). In some examples, navigation device 106 may determine insertion path 118 based on user selected positions. For example, navigation device 106 may generate a visual representation of an area or volume of a patient from the one or more images and display the visual representation as a user interface on a display, such as display device 138. The clinician may indicate, via a user input, a portion of the visual representation that corresponds to a desired treatment site and a portion of the visual representation that corresponds to a desired insertion point. Navigation device 106 may receive the indications of the portions and determine an insertion path 118 that links the treatment site and the insertion point. Navigation device 106 may determine one or more parameters corresponding to percutaneous insertion path 118. The one or more parameters may be configured to characterize insertion path 118, such that a clinician or guidance system may use the parameters to guide injection needle 116 along insertion path 118. For example, insertion path 118 may have an orientation and a depth relative to a plane of medical device assembly 102 that may be expressed in a variety of coordinate systems, such as a spherical coordinate system and/or cartesian coordinate system. In some examples, the one or more parameters may correspond to a particular coordinate system used to guide or control injection needle along insertion path 118. As one example, as will be illustrated in FIGS. 9A-9B and 10A-10B, the orientation of insertion path 118 may be expressed in spherical coordinates, such that the one or more parameters may include an azimuthal angle along the plane and a polar angle from the plane. As another example, as will be illustrated in FIGS. 9C-9D, the orientation of insertion path 118 may be expressed in cartesian coordinates, such that the one or more parameters may include an x-axis position and a y-axis position along the plane.

The method includes outputting, by navigation device 106, one or more parameters corresponding to percutaneous insertion path 118 (238). For example, the one or more parameters may be output to a database and saved for future procedures, or may be directly output to guidance system 136 for guiding, or providing guidance for, insertion of injection needle 116.

Figure 11B:
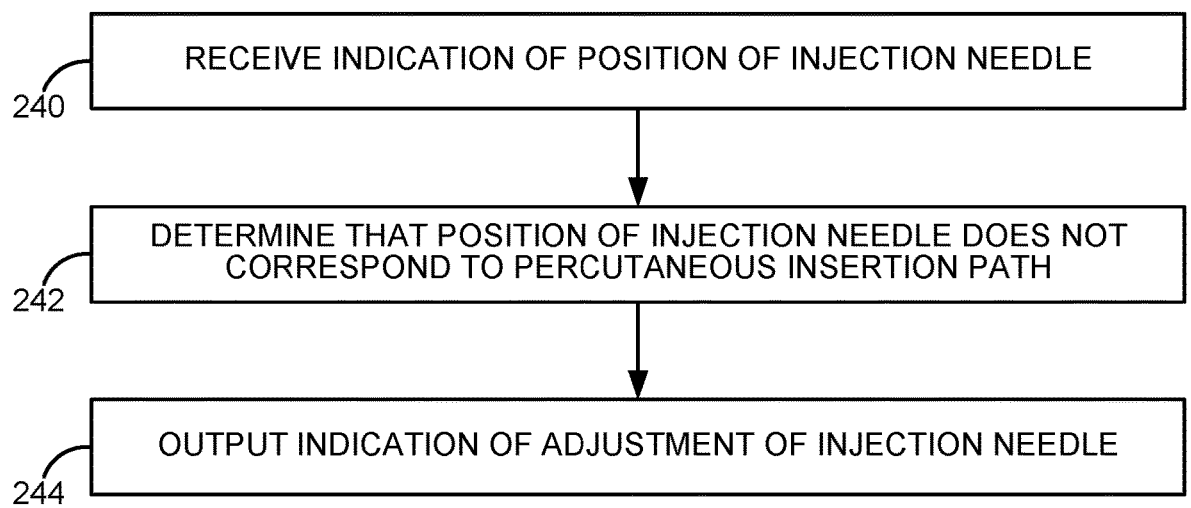
FIG. 11B is a flow diagram illustrating an example technique for adjusting a percutaneous insertion path of an injection needle, in accordance with some examples of the disclosure.

FIG. 11B is a flow diagram illustrating an example technique for adjusting a percutaneous insertion path of an injection needle, in accordance with some examples of the disclosure. The example technique of FIG. 11B will be described with respect to medical device navigation systems 100 and 130 of FIGS. 1 and 8, respectively; however, the technique of FIG. 11A may be used for other medical device navigation systems.

The method includes receiving, by navigation device 106, an indication of a position of injection needle 116 (240). For example, navigation device 106 may receive an indication from one or more sensors, such as sensors 154A and 154B of FIGS. 9A-9B, sensors 184A and 184B of FIGS. 9C-9D, or sensors 214 of FIGS. 10A and 10B, or imaging device 104 as to an orientation or insertion depth of injection needle 116.

The method includes determining, by navigation device 106, that the position of injection needle 116 does not correspond to percutaneous insertion path 118 (242). For example, navigation device 106 may compare the orientation or insertion depth of injection needle 116 with insertion path 118 and identify one or more differences in the orientation or insertion depth of injection needle 116 and insertion path 118. Navigation device 106 may determine one or more adjustments to the one or more parameters to align, or more closely align, injection needle 116 along insertion path 118.

The method includes outputting, by navigation device 106 and to guidance system 136, an indication of an adjustment of injection needle 116 (244). For example, navigation device 106 may output a display signal, such as to display device 138, indicating one or more adjustments or updated parameters of injection needle 116, or may output a control signal, such as to actuation assembly 200, to control injection needle 116 according to the one or more adjustments or updated parameters.

Figure 12:
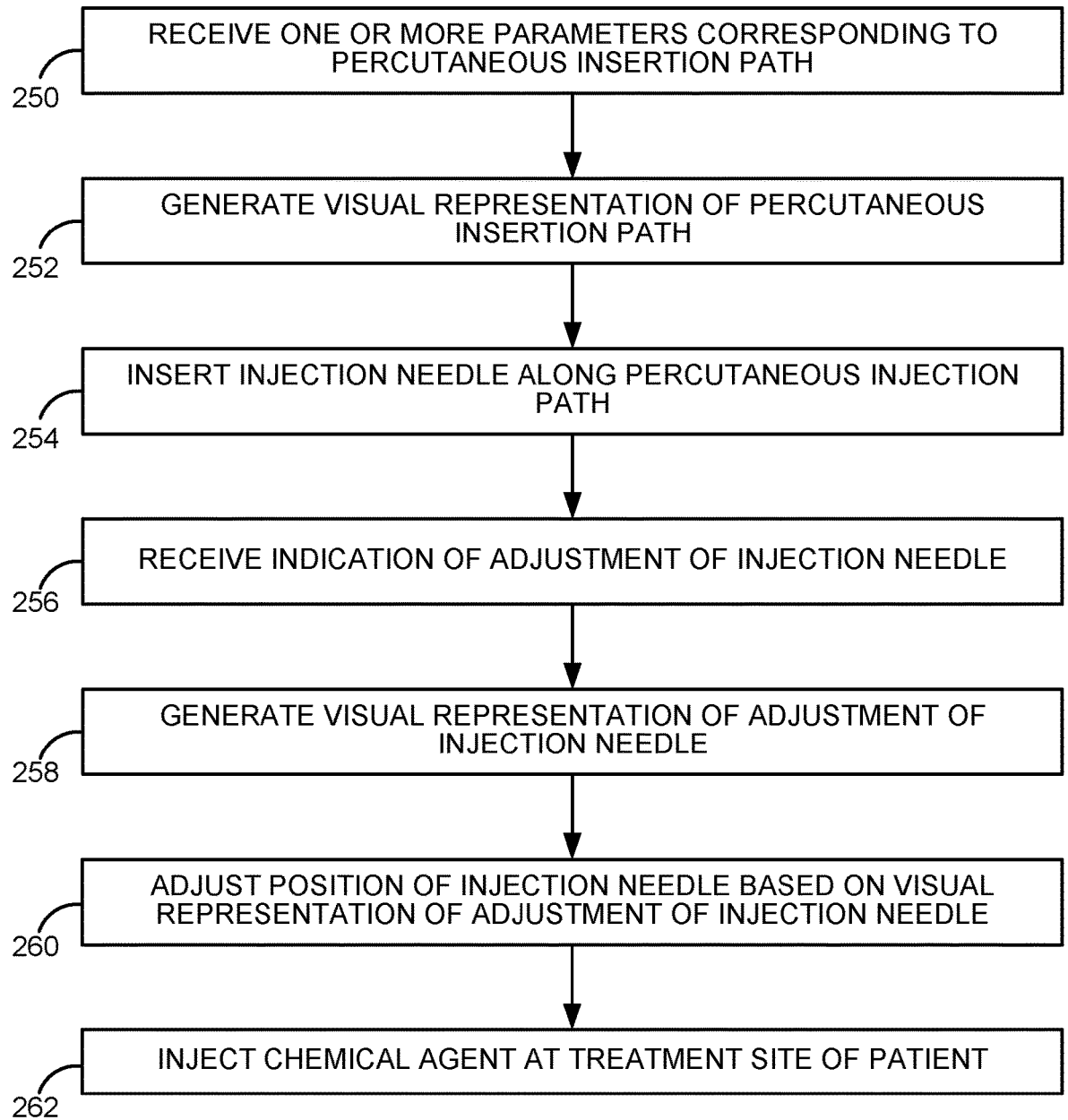
FIG. 12 is a flow diagram illustrating an example technique for manual percutaneous insertion of a medical device for performing neuromodulation of renal nerves, in accordance with some examples of the disclosure.

FIG. 12 is a flow diagram illustrating an example technique for manual percutaneous insertion of a medical device for performing neuromodulation of renal nerves, in accordance with some examples of the disclosure. The example technique of FIG. 12 will be described with respect to medical device navigation systems 100 and 130 of FIGS. 1 and 8, respectively; however, the technique of FIG. 12 may be used for other medical device navigation systems.

The method includes receiving, by display device 238, one or more parameters corresponding to percutaneous insertion path 118 (250). For example, the one or more parameters may include instructions to display a visual representation of percutaneous insertion path 118 within the patient. In response, display device 238 may generate the visual representation of insertion path 118 (252). Based on the visual representation, the clinician may insert injection needle 116 along insertion path 118 (254).

As the clinician inserts injection needle 116 into the patient, display device 138 may receive an updated visual representation of percutaneous insertion path 118 that includes an indication of an adjustment of injection needle 116 (256). In response, display device may generate and display the updated visual representation of insertion path 118 that includes the adjustments (258). Based on the updated visual representation that includes the adjustments, the clinician may adjust the position, such as the orientation or injection depth, of injection needle 116 (260). Once a distal tip of injection needle 116 is positioned at the treatment site, the clinician may inject chemical agent at the treatment site of the patient (262).

Figure 13:
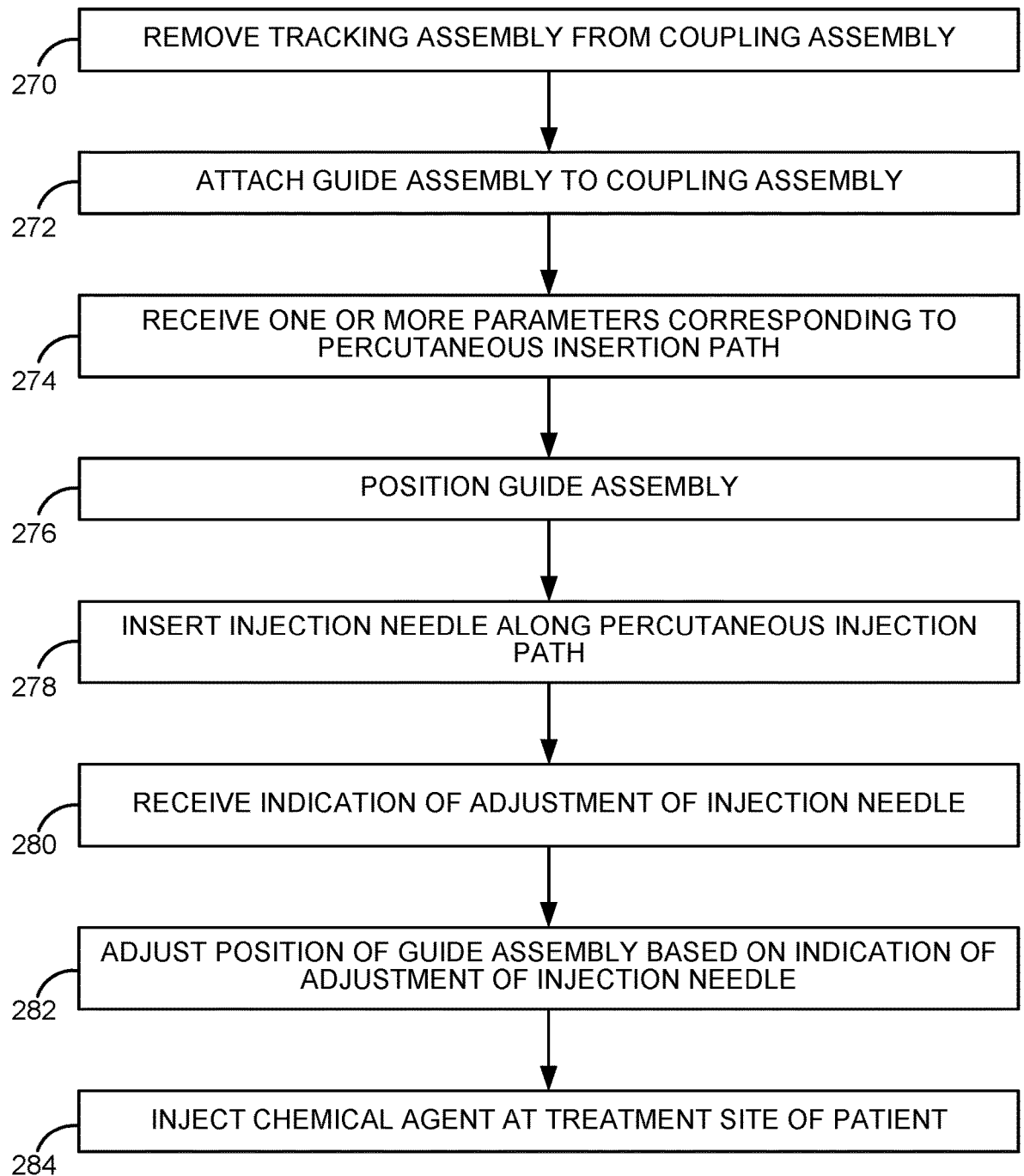
FIG. 13 is a flow diagram illustrating an example technique for augmented percutaneous insertion of a medical device for performing neuromodulation of renal nerves, in accordance with some examples of the disclosure.

FIG. 13 is a flow diagram illustrating an example technique for augmented percutaneous insertion of a medical device for performing neuromodulation of renal nerves, in accordance with some examples of the disclosure. The technique of FIG. 13 will be described with respect to guide assemblies 140 and 170 of FIGS. 9A-9D; however, the technique of FIG. 13 may be used with other guide assemblies.

The method includes removing tracking assembly 112 from coupling assembly 120 (270; see FIGS. 7A and 7B) and attaching guide assembly 140 to coupling assembly 120 (272). In some examples, such as examples in which a patient has returned for a follow-up procedure, tracking assembly 112 may already be detached from coupling assembly 120.

The method includes receiving, from navigation device 106, one or more parameters corresponding to insertion path 118 (274). For example, the one or more parameters may include instructions to display a numerical representation of the one or more parameters on display device 138. In examples in which the guide assembly is guide assembly 140, the one or more parameters may include an azimuthal angle 148 and a polar angle 150, while in examples in which the guide assembly is guide assembly 170, the one or more parameters may include an x-axis position 178 and a y-axis position 180.

The method includes positioning the guide assembly according to the one or more parameters (276). Based on the numerical representation of the one or more parameters on display device 138, the clinician may position the corresponding guide assembly 140/170 according to the one or more parameters, such as by positioning ball guide 144 or arms 174, such that the orientation and/or position of the respective channel 146 or 176 corresponds to the one or more parameters. In some examples, the clinician may receive sensor feedback, such as on display device 138, as to the orientation or position of guide assembly 140/170 and correct the orientation or position.

The method includes inserting injection needle 116 along insertion path 118 (278). For example, the clinician may insert injection needle 116 into channel 146 or 176 and continue to insert injection needle 116 to the insertion depth indicated by the one or more parameters. As the clinician inserts injection needle 116 into the patient, display device 138 may receive an updated numerical representation of the one or more parameters that includes an indication of an adjustment of injection needle 116 (280). In response, display device 138 may generate and display the updated numerical representation of the one or more parameters that includes the adjustments. Based on the updated visual representation that includes the adjustments, the clinician may adjust the position, such as the orientation or injection depth, of injection needle 116 (282). Once a distal tip of injection needle 116 is positioned at the treatment site, the clinician may inject chemical agent at the treatment site of the patient (284).

Figure 14:
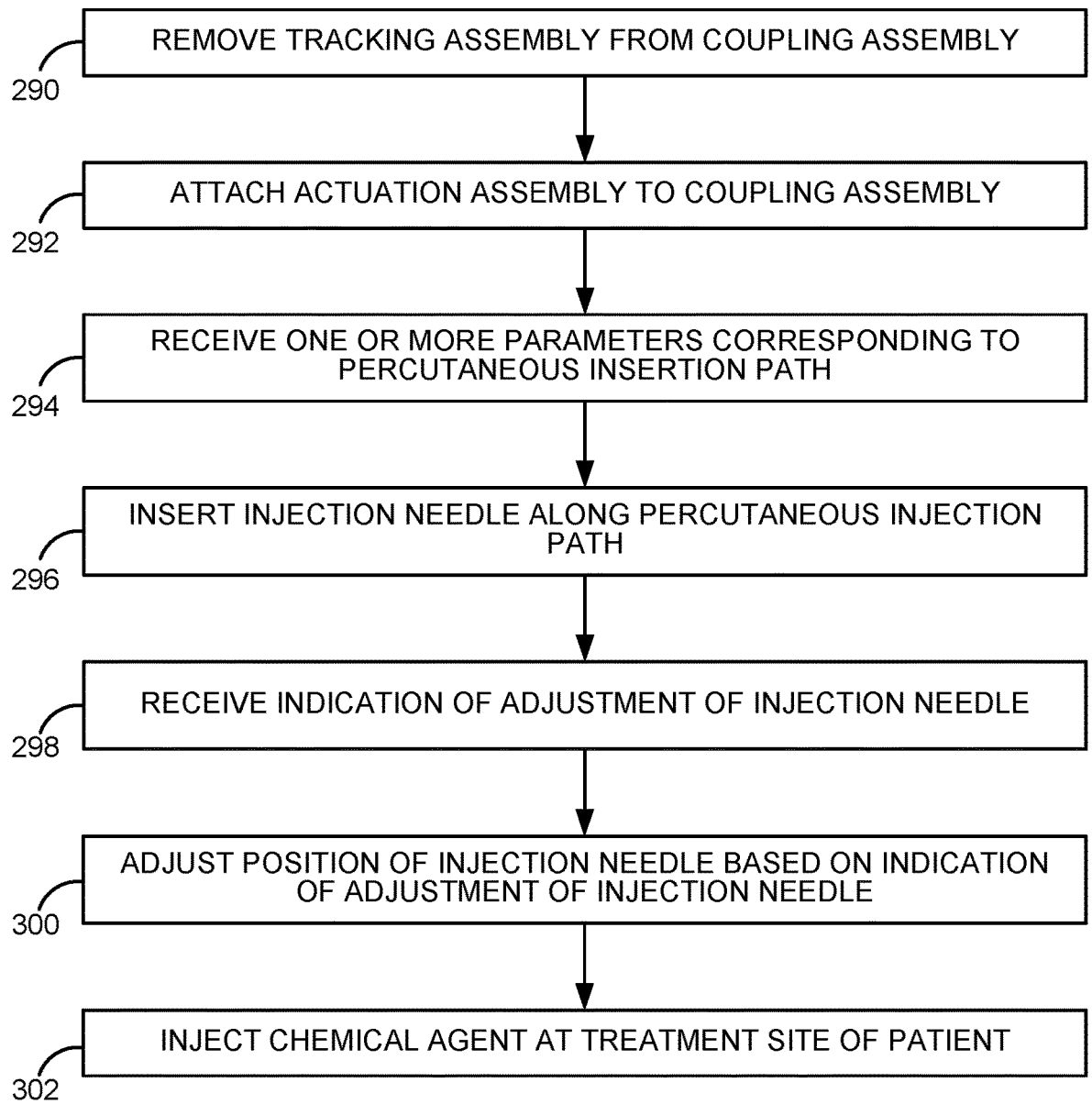
FIG. 14 is a flow diagram illustrating an example technique for automated percutaneous insertion of a medical device for performing neuromodulation of renal nerves, in accordance with some examples of the disclosure.

FIG. 14 is a flow diagram illustrating an example technique for automated percutaneous insertion of a medical device for performing neuromodulation of renal nerves, in accordance with some examples of the disclosure. The technique of FIG. 13 will be described with respect to actuation assembly 200 of FIGS. 10A-10B; however, the technique of FIG. 14 may be used with other actuation assemblies.

The method includes removing tracking assembly 112 from coupling assembly 120 (290; see FIGS. 7A and 7B) and attaching actuation assembly 200 to coupling assembly 120 (292). In some examples, such as examples in which a patient has returned for a follow-up procedure, tracking assembly 112 may already be detached from coupling assembly 120.

The method includes receiving one or more parameters corresponding to insertion path 118 (294). For example, the one or more parameters may include instructions to control injection needle 116 along insertion path 118 according to the one or more parameters. In examples in which the actuation assembly is actuation assembly 200, the one or more parameters may include an azimuthal angle 208 and a polar angle 210.

The method includes inserting injection needle 116 along insertion path 118 (296). For example, orientation actuator 216 may position an orientation of injection needle 116 according to insertion path 118 and injection actuator 206 may insert injection needle 116 along insertion path 118 and continue to insert injection needle 116 to the insertion depth indicated by the one or more parameters. As insertion actuator 206 inserts injection needle 116 into the patient, actuation assembly 200 may receive instruction that include an indication of an adjustment of injection needle 116 (298). In response to the indication of the adjustment, actuation assembly 200 may adjust the position, such as the orientation or injection depth, of injection needle 116 (300). Once a distal tip of injection needle 116 is positioned at the treatment site, actuation assembly 200 may inject chemical agent at the treatment site of the patient (302).

The above detailed descriptions of examples of the technology are not intended to be exhaustive or to limit the technology to the precise form disclosed above. Although specific examples of the technology are described above for illustrative purposes, various equivalent modifications are possible within the scope of the technology, as those skilled in the relevant art will recognize. For example, while steps are presented in a given order, alternative examples may perform steps in a different order. The various examples described herein may also be combined to provide further examples. All references cited herein are incorporated by reference as if fully set forth herein.

From the foregoing, it will be appreciated that specific examples of the present disclosure have been described herein for purposes of illustration, but that various modifications may be made without deviating from the present disclosure. For example, while particular features of the neuromodulation catheters were described as being part of a single device, in other examples, these features can be included on one or more separate devices that can be positioned adjacent to and/or used in tandem with the neuromodulation catheters to perform similar functions to those described herein. Additionally, while the description of the present technology is focused on delivering chemical agents, the present technology can equally be applied to other methods of neuromodulation therapy, including cooling, heating, electrical stimulation (using needle electrodes), RF energy delivery (using needle electrodes), microwave energy delivery (using microwave needles), ultrasound (using ultrasound transducers), or the like, that may be delivered through direct subcutaneous delivery.

Certain aspects of the present disclosure described in the context of particular examples may be combined or eliminated in other embodiments. Further, while advantages associated with certain examples have been described in the context of those examples, other examples may also exhibit such advantages, and not all examples need necessarily exhibit such advantages to fall within the scope of the present disclosure. Accordingly, the present disclosure and associated technology can encompass other examples not expressly shown or described herein.

Further, although techniques have been described in which a neuromodulation catheter is positioned at a single location within a single renal artery, in other examples, the neuromodulation catheter may be repositioned to a second treatment site within the single renal artery (e.g., proximal or distal of the first treatment site, may be repositioned in a branch of the single artery, may be repositioned within a different renal vessel on the same side of the patient (e.g., a renal vessel associated with the same kidney of the patient), may be repositioned in a renal vessel on the other side of the patient (e.g., a renal vessel associated with the other kidney of the patient), or any combination thereof. At each location where the neuromodulation catheter is positioned, renal neuromodulation may be performed using any of the techniques described herein or any other suitable renal neuromodulation technique, or any combination thereof.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "about" or "approximately," when preceding a value, should be interpreted to mean plus or minus 10% of the value, unless otherwise indicated. Additionally, the term "comprising" is used throughout to mean including at least the recited feature(s) such that any greater number of the same feature and/or additional types of other features are not precluded.

What is claimed is:

1. A medical device assembly, comprising:
   an adhesive patch configured to adhere to an outer surface of a patient;
   a tracking assembly irremovably coupled to the adhesive patch, wherein the tracking assembly comprises one or more reference markers; and
   a guide assembly configured to removably couple to the adhesive patch, wherein the guide assembly defines an orientation of a percutaneous insertion path of an injection needle from an insertion point to a treatment site of the patient.

2. The medical device assembly of claim 1,
   wherein the adhesive patch is configured to define a plane as placed on the outer surface of the patient, and
   wherein the guide assembly is configured to define the orientation of the percutaneous insertion path according to an azimuthal angle in the plane and a polar angle from the plane.

3. The medical device assembly of claim 1,
   wherein the adhesive patch is configured to define a plane as placed on the outer surface of the patient, and
   wherein the guide assembly is configured to define the orientation of the percutaneous insertion path according to an x-axis position and a y-axis position in the plane.

4. The medical device assembly of claim 1, further comprising an injection pad configured to receive a distal end of the needle at the insertion point.

5. The medical device assembly of claim 1, wherein the adhesive patch is configured to adhere to the outer surface of the patient for at least two weeks.

6. The medical device assembly of claim 1, wherein the medical device assembly has a total surface area less than about 100 square centimeters.

7. The medical device assembly of claim 1, wherein the one or more reference markers comprise one or more radiopaque markers.

8. A medical device assembly, comprising:
   an adhesive patch configured to adhere to an outer surface of a patient;
   a coupling assembly irremovably coupled to the adhesive patch;
   a tracking assembly configured to removably couple to the coupling assembly, wherein the tracking assembly comprises one or more reference markers; and
   a guide assembly configured to removably couple to the coupling assembly, wherein the guide assembly defines an orientation of a percutaneous insertion path of an injection needle from an insertion point to a treatment site of the patient,
   wherein the coupling assembly is configured to permit attachment and removal of one of the tracking assembly or the guide assembly at a time.

9. The medical device assembly of claim 8, wherein a combined depth of the adhesive patch and the coupling assembly is less than or equal to about 0.5 inches.

* * * * *